United States Patent
Ku et al.

(10) Patent No.: US 11,256,844 B2
(45) Date of Patent: Feb. 22, 2022

(54) CELL ROW ARRANGEMENT IN REGIONS OF INTEGRATED CIRCUIT LAYOUT

(71) Applicant: TAIWAN SEMICONDUCTOR MANUFACTURING CO., LTD., Hsinchu (TW)

(72) Inventors: Chun-Yao Ku, Hsinchu (TW); Wen-Hao Chen, Hsinchu (TW); Ming-Tao Yu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/025,296

(22) Filed: Sep. 18, 2020

(65) Prior Publication Data

US 2021/0240901 A1 Aug. 5, 2021

Related U.S. Application Data

(60) Provisional application No. 62/968,605, filed on Jan. 31, 2020.

(51) Int. Cl.
| | | |
|---|---|---|
| *G06F 30/30* | (2020.01) | |
| *H01L 23/528* | (2006.01) | |
| *H01L 27/02* | (2006.01) | |
| *G06F 30/392* | (2020.01) | |
| *G06F 30/398* | (2020.01) | |
| *G06F 30/394* | (2020.01) | |
| *G06F 111/20* | (2020.01) | |
| *G06F 115/06* | (2020.01) | |
| *G06F 119/06* | (2020.01) | |
| *G06F 119/12* | (2020.01) | |

(52) U.S. Cl.
CPC .......... *G06F 30/392* (2020.01); *G06F 30/394* (2020.01); *G06F 30/398* (2020.01); *H01L 23/528* (2013.01); *H01L 27/0207* (2013.01); *G06F 2111/20* (2020.01); *G06F 2115/06* (2020.01); *G06F 2119/06* (2020.01); *G06F 2119/12* (2020.01)

(58) Field of Classification Search
CPC ... G06F 30/30–398; G06F 2111/00–20; G06F 2115/001–12; G06F 2119/00–22; H01L 23/528; H01L 27/0207
See application file for complete search history.

(56) References Cited

U.S. PATENT DOCUMENTS

| | | |
|---|---|---|
| 7,260,442 B2 | 8/2007 | Hwang et al. |
| 9,256,709 B2 | 2/2016 | Yu et al. |
| 10,290,653 B2 * | 5/2019 | Chen ............... H01L 27/092 |

(Continued)

*Primary Examiner* — Leigh M Garbowski
(74) *Attorney, Agent, or Firm* — Hauptman Ham, LLP

(57) ABSTRACT

A method of generating a layout design of an integrated circuit. The method includes forming a first region having at least two first-type cell rows extending in a first direction. Each one of the first-type cell rows has a first row height measured along a second direction perpendicular to the first direction. The method also includes forming a second region having at least two second-type cell rows extending in the first direction. Each one of the second-type cell rows has a second row height measured along the second direction. The first region is adjacent to the second region, and the first row height of the first-type cell rows is different from the second row height of the second-type cell rows.

20 Claims, 28 Drawing Sheets

(56) References Cited

U.S. PATENT DOCUMENTS

| | | | |
|---|---|---|---|
| 11,011,545 B2 * | 5/2021 | Guo | .................... H01L 27/0924 |
| 2014/0040838 A1 | 2/2014 | Liu et al. | |
| 2015/0278429 A1 | 10/2015 | Chang | |
| 2019/0164949 A1 * | 5/2019 | Sio | .................... H01L 27/11807 |

* cited by examiner

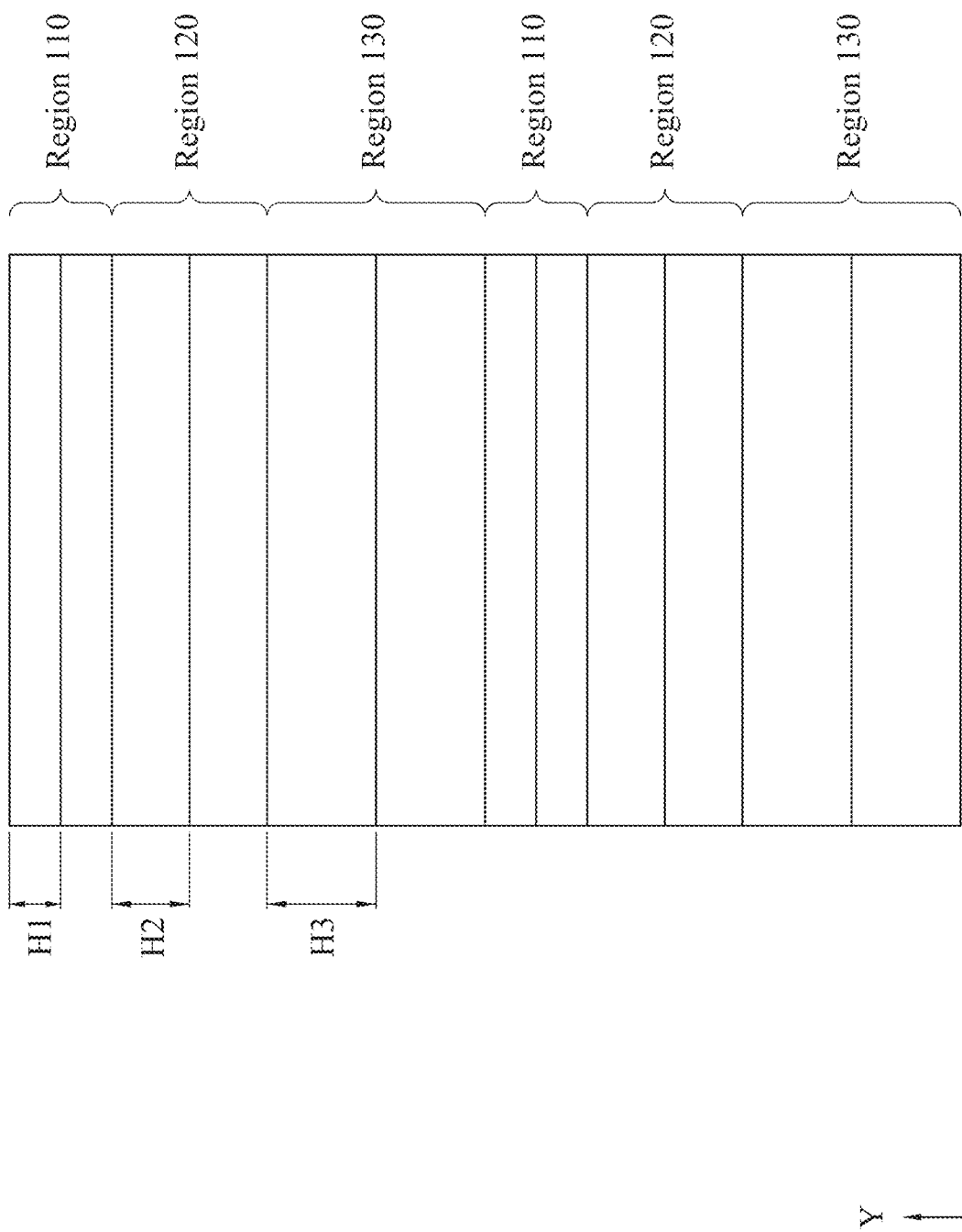

CELL ROW ARRANGEMENT IN REGIONS OF INTEGRATED CIRCUIT LAYOUT

PRIORITY CLAIM

The present application claims the priority of U.S. Provisional Application No. 62/968,605, filed Jan. 31, 2020, which is incorporated herein by reference in its entirety.

BACKGROUND

The recent trend in miniaturizing integrated circuits (ICs) has resulted in smaller devices which consume less power yet provide more functionality at higher speeds. The miniaturization process has also resulted in more strict restriction on the layout design of the IC circuits. In the design of the ICs, predesigned cells having well-defined functions are stored in cell libraries. When designing an integrated circuit, the predesigned cells are retrieved from the cell libraries and placed into designated locations in a layout of the integrated circuit. Conductive lines are designed in the layout to connect the predesigned cells to provide the routing. During the layout design, the selection of the designated locations for the predesigned cells and the associated routing often need to consider the optimization of the speed or the optimization of the power consumption for various components in the ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 10A-10B and FIGS. 11A-11B are schematic diagrams of vertical arrangements of three types of regions, in accordance with some embodiments.

DETAILED DESCRIPTION

Figure 1A:
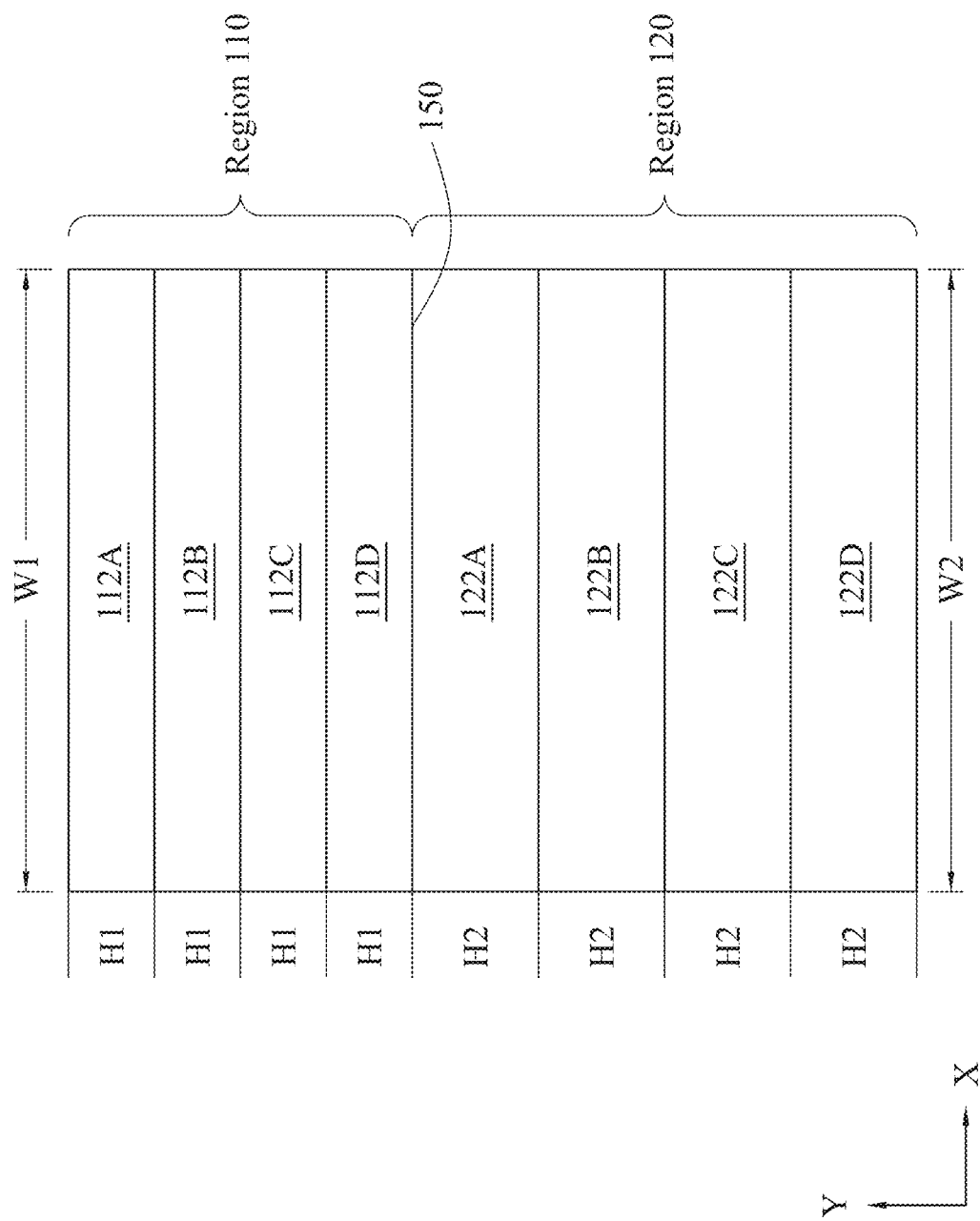
FIG. 1A is a schematic diagram of an arrangement of cell rows in a layout design of an integrated circuit, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

During layout design, different types of predesigned cells are used for various optimizations of the IC circuits. For example, it is possible to select one type of predesigned cells for speed optimization and to select another type of predesigned cells for power consumption optimization. Different types of predesigned cells are placed in different types of cell rows in a layout. When different types of cell rows are grouped into regions and each region has two or more cell rows of the same type, during the cell replacement and rerouting process to mitigate design rule violations, it is possible to reduce the length increase of the conductive connections associated with the rerouting process for some layout designs. FIG. 1A is a schematic diagram of an arrangement of cell rows in a layout design of an integrated circuit, in accordance with some embodiments. In FIG. 1A, the layout design includes a first group of cell rows in a region 110 and a second group of cell rows in a region 120. The region 110 includes first-type cell rows 112A, 112B, 112C, and 112D. The region 120 includes second-type cell rows 122A, 122B, 122C, and 122D. The region 110 is adjacent to the region 120 along a boundary 150 that extends in the X-direction. Each first-type cell row (e.g., 112A, 112B, 112C, or 112D) in the region 110 has a width W1 measured along the X-direction and has a first row height H1 measured along the Y-direction. Each second-type cell row (e.g., 122A, 122B, 122C, or 122D) in the region 120 has a width W2 measured along the X-direction and has a second row height H2 measured along the Y-direction.

Figure 1B:
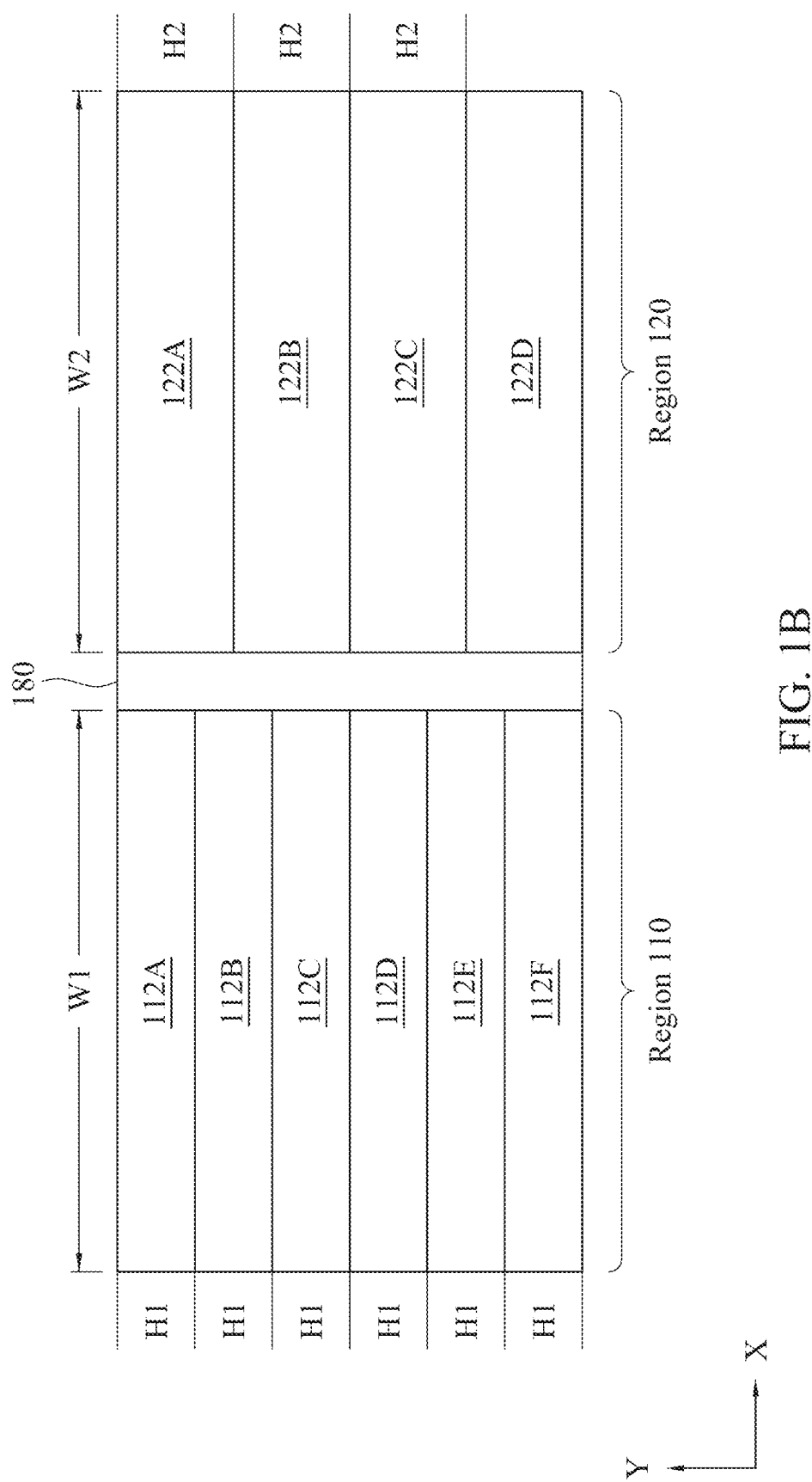
FIG. 1B is a schematic diagram of an arrangement of cell rows in another layout design of an integrated circuit, in accordance with some embodiments.

FIG. 1B is a schematic diagram of an arrangement of cell rows in another layout design of an integrated circuit, in accordance with some embodiments. In FIG. 1B, the layout design includes a first group of cell rows in a region 110 and a second group of cell rows in a region 120. The region 110 includes first-type cell rows 112A, 112B, 112C, 112D, 112E, and 112F. The region 120 includes second-type cell rows 122A, 122B, 122C, and 122D. The region 110 is adjacent to the region 120 along a separation channel 180 between the region 110 and the region 120, with the separation channel 180 extending in the Y-direction. Each first-type cell row (e.g., 112A, 112B, 112C, 112D, 112E, or 112F) in the region 110 has a width W1 measured along the X-direction and has a first row height H1 measured along the Y-direction. Each second-type cell row (e.g., 122A, 122B, 122C, or 122D) in the region 120 has a width W2 measured along the X-direction and has a second row height H2 measured along the Y-direction.

In FIG. 1A and FIG. 1B, the first row height H1 of the first-type cell row in the region 110 is different from the second row height H2 of the second-type cell row in the region 120. In some embodiments, standard cells are placed in each first-type cell row in the region 110. In some embodiments, the cell height of each cell in the first-type cell rows is identical to the first row height H1 of the first-type cell rows. In some embodiments, one or more cells in the first-type cell rows have cell heights that are different from the first row height H1 of the first-type cell rows. In some embodiments, standard cells are placed in each second-type cell row in the region 120. In some embodiments, the cell height of each cell in the second-type cell rows is identical to the second row height H2 of the second-type cell rows. In some embodiments, one or more cells in the second-type cell rows have cell heights that are different from the second row height H2 of the second-type cell rows.

Figure 2A:
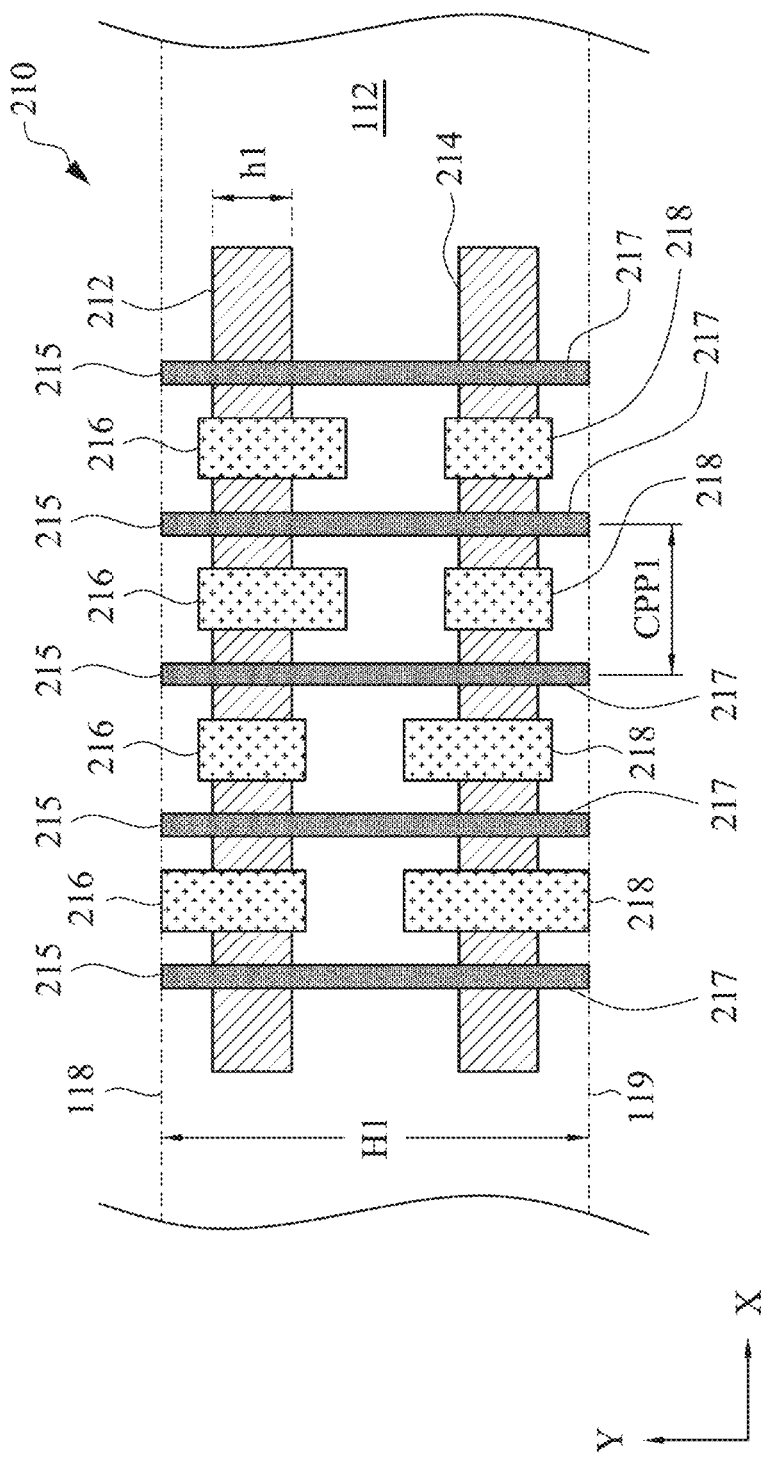
FIG. 2A is a schematic diagram of a partial layout of a cell in a first-type cell row, in accordance with some embodiments.

FIG. 2A is a schematic diagram of a partial layout of a cell in a first-type cell row, in accordance with some embodiments. In FIG. 2A, the cell 210 in a first-type cell row 112 is placed between horizontal boundaries 118 and 119 (extending in the X-direction) of the first-type cell row 112. The cell 210 has a cell height which is the same as the first row height H1 of the first-type cell row 112. Examples of the first-type cell row 112 include the first-type cell rows 112A-112D in the region 110 of FIG. 1A and 112A-112F in the region 110 of FIG. 1B. The first-type cell row 112 includes active zones 212 and 214 extending in the X-direction.

In FIG. 2A, transistors are formed over the active zone 212. The cell 210 includes one or more gate strips 215, extending in the Y-direction, that intersect the active zone 212 to form the gates of the transistors over the channel regions in the active zone 212. The cell 210 also includes one or more conductive segments 216, extending in the Y-direction, that intersect the active zone 212 to form the drain/source terminals of the transistors over the active regions in the active zone 212. In FIG. 2A, transistors are formed over the active zone 214. The cell 210 includes one or more gate strips 217, extending in the Y-direction, that intersect the active zone 214 to form the gates of the transistors over the channel regions in the active zone 214. The cell 210 also includes one or more conductive segments 218, extending in the Y-direction, that intersect the active zone 214 to form the drain/source terminals of the transistors over the active regions in the active zone 214. In some embodiments, the active zone 212 is a p-type active zone, and the active zone 214 is an n-type active zone. Correspondingly, the transistors constructed over the active zone 212 are p-type transistors, and the transistors constructed over the active zone 212 are n-type transistors.

In FIG. 2A, the pitch distance between two neighboring gate strips 215 (or between two neighboring gate strips 217) is uniformly equal to the first contacted poly pitch CPP1. The pitch distance is measured between the midpoints of two neighboring gate strips. In FIG. 2A, the layout pattern of each gate strip 215 is directly connected to the layout pattern of a corresponding gate strip 217. In some embodiments, however, one or more gate strips 215 are not directly connected to their corresponding gate strips 217, in a fabricated integrated circuit corresponding to the partial layout of FIG. 2A. Specifically, even if a gate strip 215 is aligned with a corresponding gate strip 217 vertically along the Y-direction, in some embodiments, the two gate strips 215 and 217 that are vertically aligned with each other do not necessarily form any direct conductive connection, because FIG. 2A depicts only a partial layout of the cell 210. The partial layout has not included the layout patterns for indicating the cut of one or more connections between the gate strips 215 and their corresponding gate strips 217. The partial layout in FIG. 2A also has not included the layout patterns for specifying via connections and the layout patterns for specifying routing connections in various metal layers.

Figure 2B:
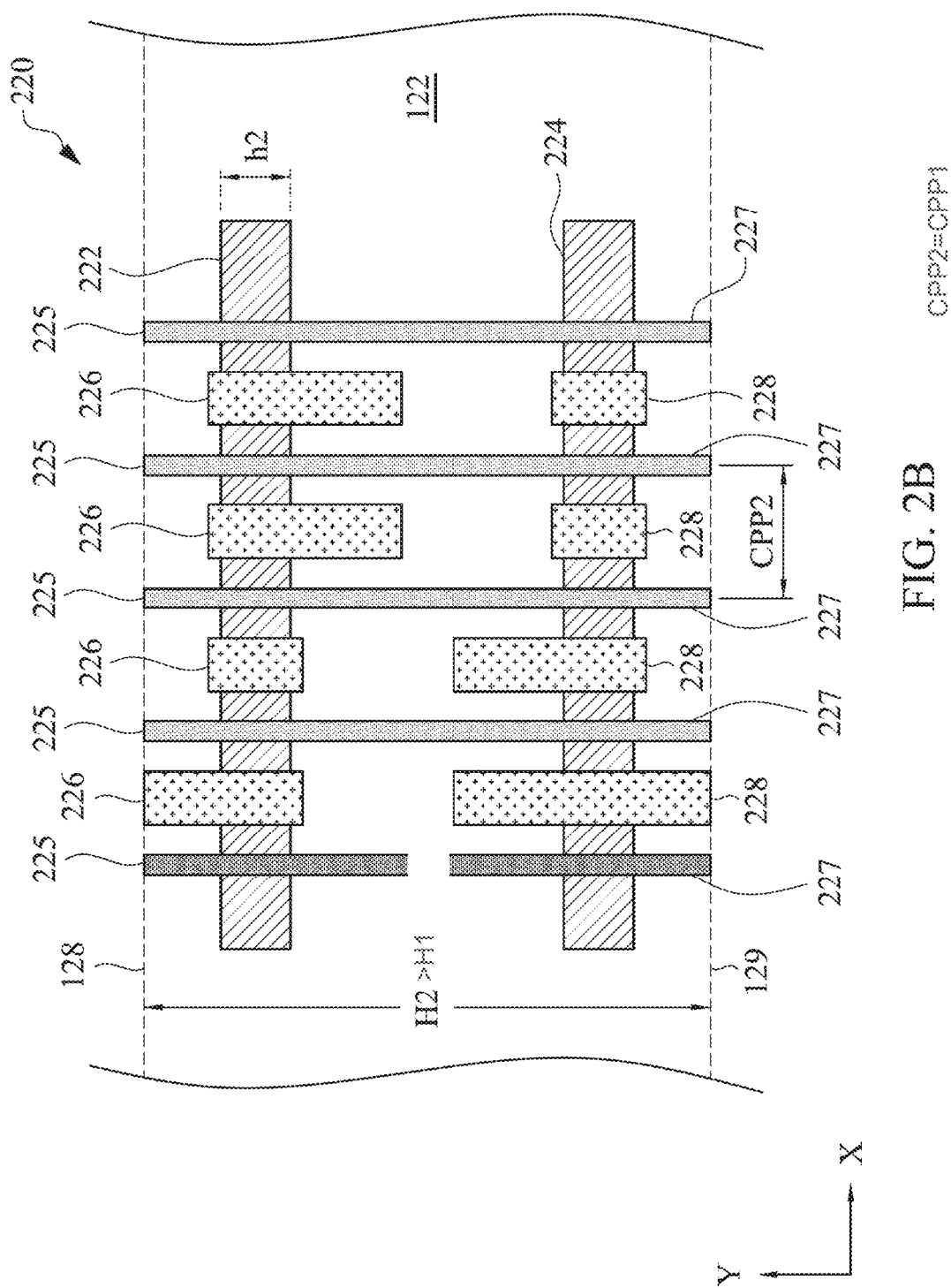
FIG. 2B is a schematic diagram of a partial layout of a cell in a second-type cell row, in accordance with some embodiments.

FIG. 2B is a schematic diagram of a partial layout of a cell in a second-type cell row, in accordance with some embodiments. In FIG. 2A, the cell 220 in the second-type cell row 122 is placed between horizontal boundaries 128 and 129 (extending in the X-direction) of the second-type cell row 122. The cell 220 has a cell height which is the same as the second row height H2 of the second-type cell row 122. Examples of the second-type cell row 122 include the second-type cell rows 122A-122D in the region 120 of FIG. 1A or FIG. 1B. The second-type cell row 122 includes active zones 222 and 224 extending in the X-direction.

In FIG. 2B, transistors are formed over the active zone 222, and over the active zone 224. The gates of the transistors over the active zone 222 are formed with gate strips 225, and the gates of the transistors over the active zone 224 are formed with gate strips 227. The drain/source terminals of the transistors over the active zone 222 are formed with conductive segments 226, and the drain/source terminals of the transistors over the active zone 224 are formed with conductive segments 228. In some embodiments, the active zone 222 is a p-type active zone, and the active zone 224 is an n-type active zone. Additionally, in some embodiments, one or more gate strips 225 are not directly connected to their corresponding gate strips 227, because the partial layout of the cell 220 has not included the layout patterns for indicating the cut of one or more connections between the gate strips 225 and their corresponding gate strips 227. In FIG. 2B, the pitch distance between two neighboring gate strips 225 (or between two neighboring gate strips 227) is uniformly equal to the second contacted poly pitch CPP2.

In FIG. 2A and FIG. 2B, the first row height H1 of the first-type cell row 112 is different from the second row height H2 of the second-type cell row 122. Additionally, in some embodiments, at least one active zone in the first-type cell row 112 has a conductive property that is different from the conductive property of a corresponding active zone in the second-type cell row 122. In some embodiments, at least one active zone in the first-type cell row 112 has a first predetermined number of conductive strips that is different from a second predetermined number of conductive strips in a corresponding active zone in the second-type cell row 122. In some embodiments, the conductive strips extending in the X-direction in the first-type cell row 112 are fin structures for forming fin transistors in the first-type cell row 112, and the conductive strips extending in the X-direction in the second-type cell row 122 are fin structures for forming fin transistors in the second-type cell row 122. In some embodiments, the conductive strips extending in the X-direction in the first-type cell row 112 are nanosheets for forming nanosheet transistors in the first-type cell row 112, and the conductive strips extending in the X-direction in the second-type cell row 122 are nanosheets for forming nanosheet transistors in the second-type cell row 122. In some embodiments, the conductive strips extending in the X-direction in the first-type cell row 112 are nanowires for forming nanowire transistors in the first-type cell row 112, and the conductive strips extending in the X-direction in the second-type cell row 122 are nanowires for forming nanowire transistors in the second-type cell row 122.

Figure 5A:
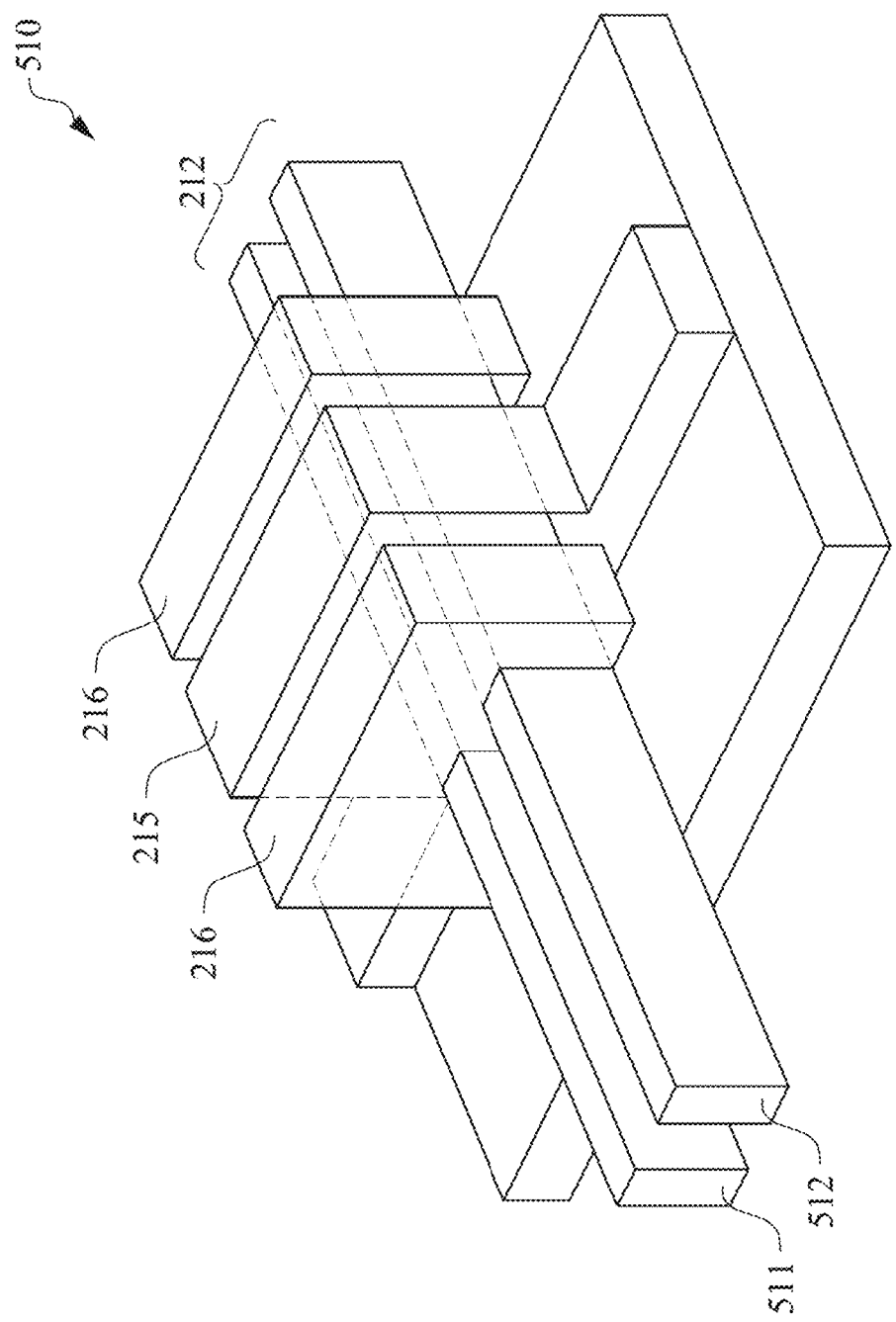
FIGS. 5A-5B are perspective views of fin transistors formed in the active zones under gate strips and conductive segments, in accordance with some embodiments.
Figure 5B:
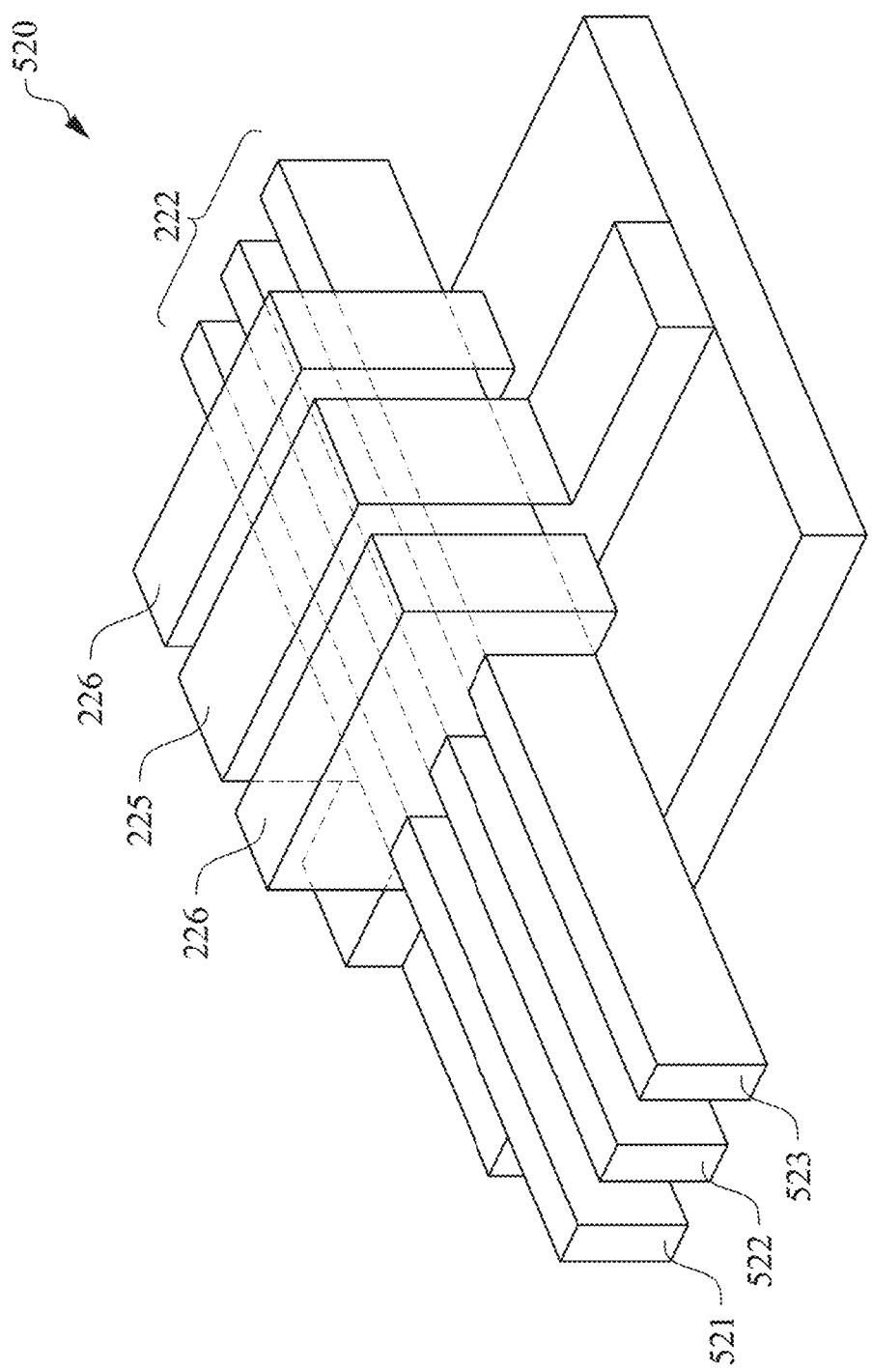

In some implementations of layout designs, the difference between the first predetermined number of conductive strips in a first active zone and the second predetermined number of conductive strips in a second active zone is manifested as a difference between the height of the first active zone and the height of the second active zone. For example, the first height h1 of the active zone 212 in the first-type cell row 112 (as shown in FIG. 2A) is different from the second height h2 of the active zone 222 in the second-type cell row 122 (as shown in FIG. 2B). In some implementations of layout designs, the difference between the first height h1 of the active zone 212 and the second height h2 of the active zone 222 represents a difference between the first predetermined number of conductive strips in the active zone 212 and the second predetermined number of conductive strips in the active zone 222. In some implementations, the active zone 212 includes two fin structures extending in the X-direction (as shown in FIG. 5A), and the active zone 222 includes three fin structures extending in the X-direction (as shown in FIG. 5B).

In FIG. 2A and FIG. 2B, in some embodiments, at least one active zone in the first-type cell row 112 has a conductive property different from the conductive property of at least one active zone in the second-type cell row 122. In some embodiments, at least one of the active zones 212 and 214 in FIG. 2A differs from the corresponding one of the active zones 222 and 224 in FIG. 2B. In some embodiments, each of the active zones 212 and 214 in FIG. 2A differs from the corresponding one of the active zones 222 and 224 in FIG. 2B. For example, in some embodiments, each of the active zones 212 and 214 in FIG. 2A has two fin structures extending in the X-direction, while each of the active zones 222 and 224 in FIG. 2B has three fin structures extending in the X-direction. In some embodiments, the first contacted poly pitch CPP1 in the first-type cell row 112 (e.g., as shown in FIG. 2A) is the same as the second contacted poly pitch CPP2 in the second-type cell row 122 (e.g., as shown in FIG. 2B). In some embodiments, the first contacted poly pitch CPP1 in the first-type cell row 112 differs from the second contacted poly pitch CPP2 in the second-type cell row 122.

Figure 3A:
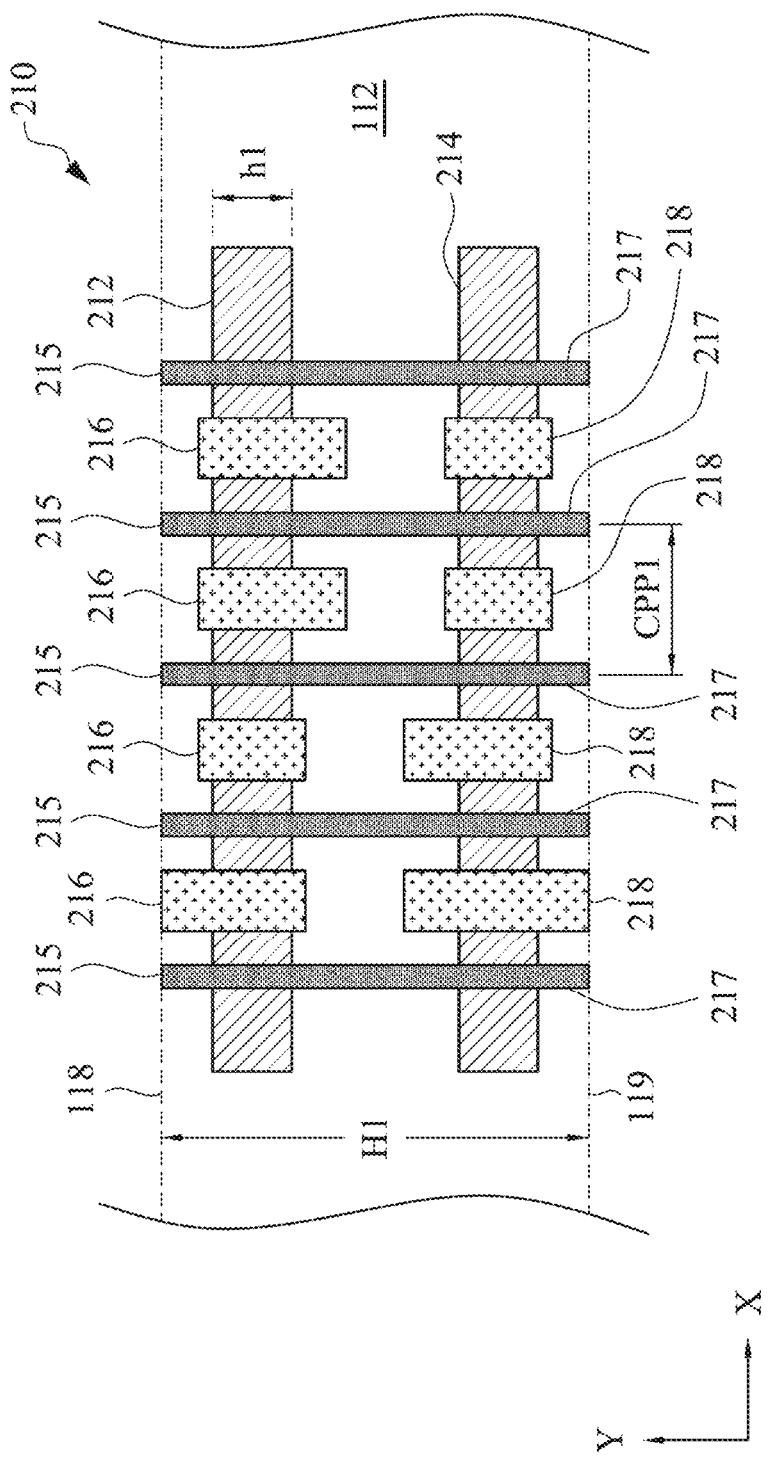
FIG. 3A is a schematic diagram of a partial layout of a cell in a first-type cell row having a first contacted poly pitch, in accordance with some embodiments.
Figure 3B:
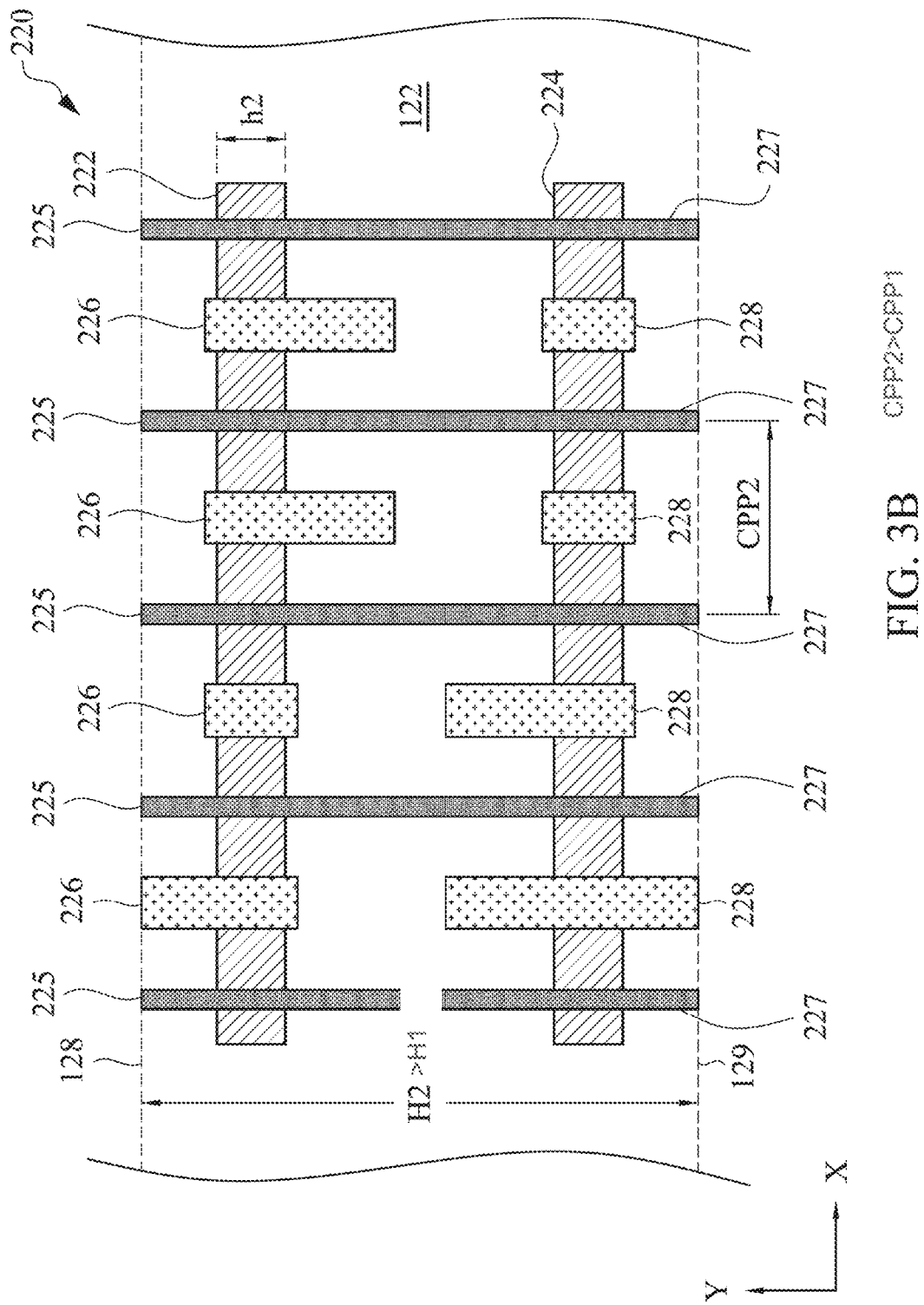
FIG. 3B is a schematic diagram of a partial layout of a cell in a second-type cell row having a second contacted poly pitch, in accordance with some embodiments.

FIG. 3A is a schematic diagram of a partial layout of a cell in a first-type cell row having a first contacted poly pitch, in accordance with some embodiments. FIG. 3B is a schematic diagram of a partial layout of a cell in a second-type cell row having a second contacted poly pitch, in accordance with some embodiments. The first contacted poly pitch CPP1 in the first-type cell row 112 in FIG. 3A is smaller than the second contacted poly pitch CPP2 in the second-type cell row 122 in FIG. 3B, while the first row height H1 of the first-type cell row 112 is smaller than the second row height H2 of the second-type cell row 122. In alternative embodiments, the first contacted poly pitch in the first-type cell row CPP1 is larger than the second contacted poly pitch CPP2 in the second-type cell row, while the first row height H1 of the first-type cell row is smaller than the second row height H2 of the second-type cell row.

Figure 4A:
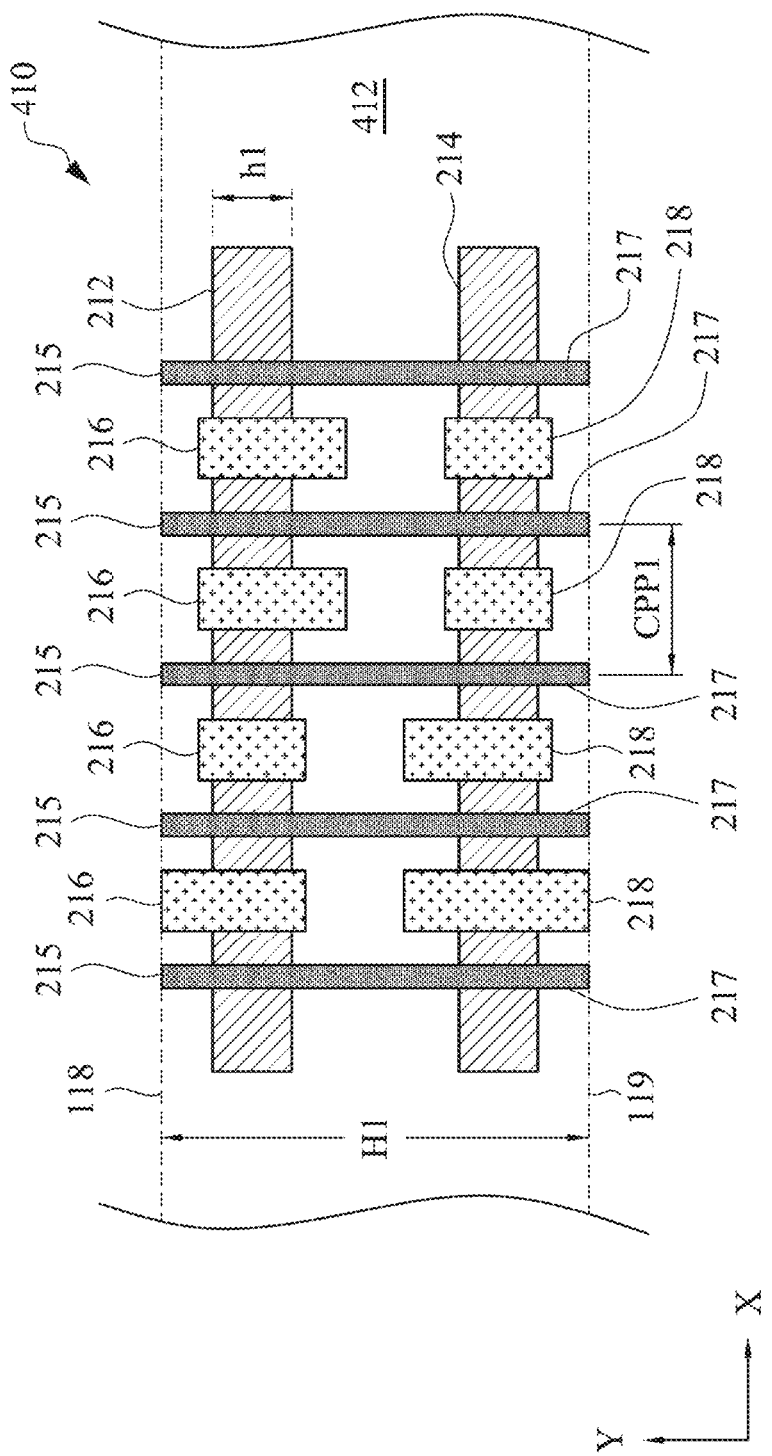
FIG. 4A is a schematic diagram of a partial layout of a cell in a first-type cell row having a first contacted poly pitch, in accordance with some embodiments.
Figure 4B:
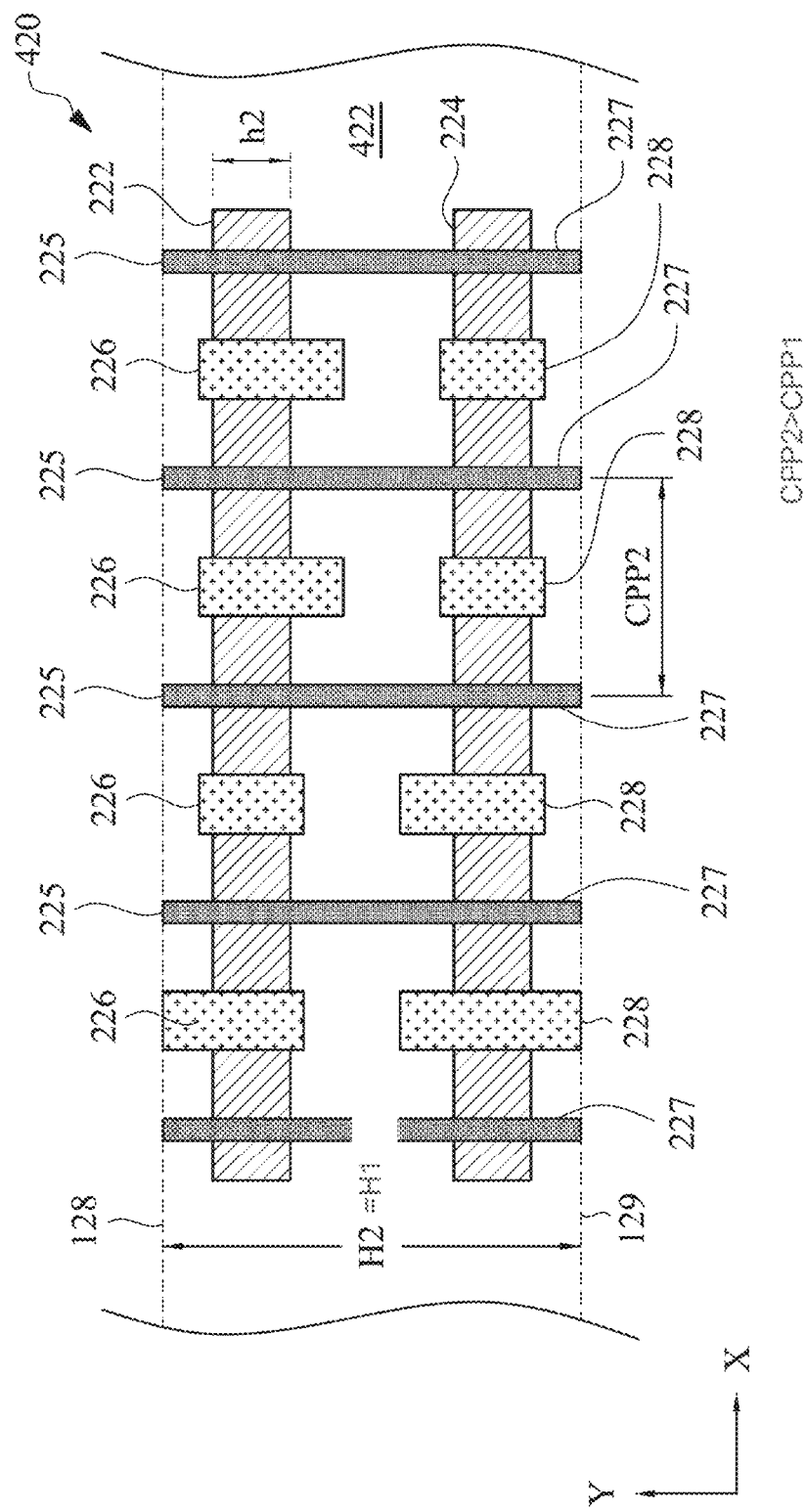
FIG. 4B is a schematic diagram of a partial layout of a cell in a second-type cell row having a second contacted poly pitch, in accordance with some embodiments.

FIG. 4A is a schematic diagram of a partial layout of a cell 410 in a first-type cell row 412 having a first contacted poly pitch, in accordance with some embodiments. FIG. 4B is a schematic diagram of a partial layout of a cell 420 in a second-type cell row 422 having a second contacted poly pitch, in accordance with some embodiments. Unlike the embodiments in FIGS. 3A-3B (in which the first row height H1 of the first-type cell row is different from the second row height H2 of the second-type cell row), in the embodiments of FIGS. 4A-4B, the first row height H1 of the first-type cell row 412 is equal to the second row height H2 of the second-type cell row 422. Additionally, the first contacted poly pitch CPP1 in the first-type cell row 412 in FIG. 4A is smaller than the second contacted poly pitch CPP2 in the second-type cell row 422 in FIG. 4B. In alternative embodiments, the first contacted poly pitch CPP1 in the first-type cell row is larger than the second contacted poly pitch in the second-type cell row, while the first row height of the first-type cell row is equal to the second row height of the second-type cell row.

FIGS. 5A-5B are perspective views of fin transistors formed in the active zones under the gate strips and the conductive segments, in accordance with some embodiments. In FIG. 5A, a fin transistor 510 is formed over two fin structures 511 and 512 in the active zone 212 as specified by the partial layout design in FIG. 2A. The gate of the transistor 510 is formed with the gate strip 215 over the fin structures 511 and 512. The source terminal and drain terminal of the transistor 510 are formed with the conductive segment 216 over the fin structures 511 and 512. In FIG. 5B, a fin transistor 520 is formed over three fin structures 521, 522, and 523 in the active zone 222 as specified by the partial layout design in FIG. 2B. The gate of the transistor 520 is formed with the gate strip 225 over the fin structures 521, 522, and 523. The source terminal and drain terminal of the transistor 520 are formed with the conductive segments 226 over the fin structures 521, 522, and 523.

Figure 6:
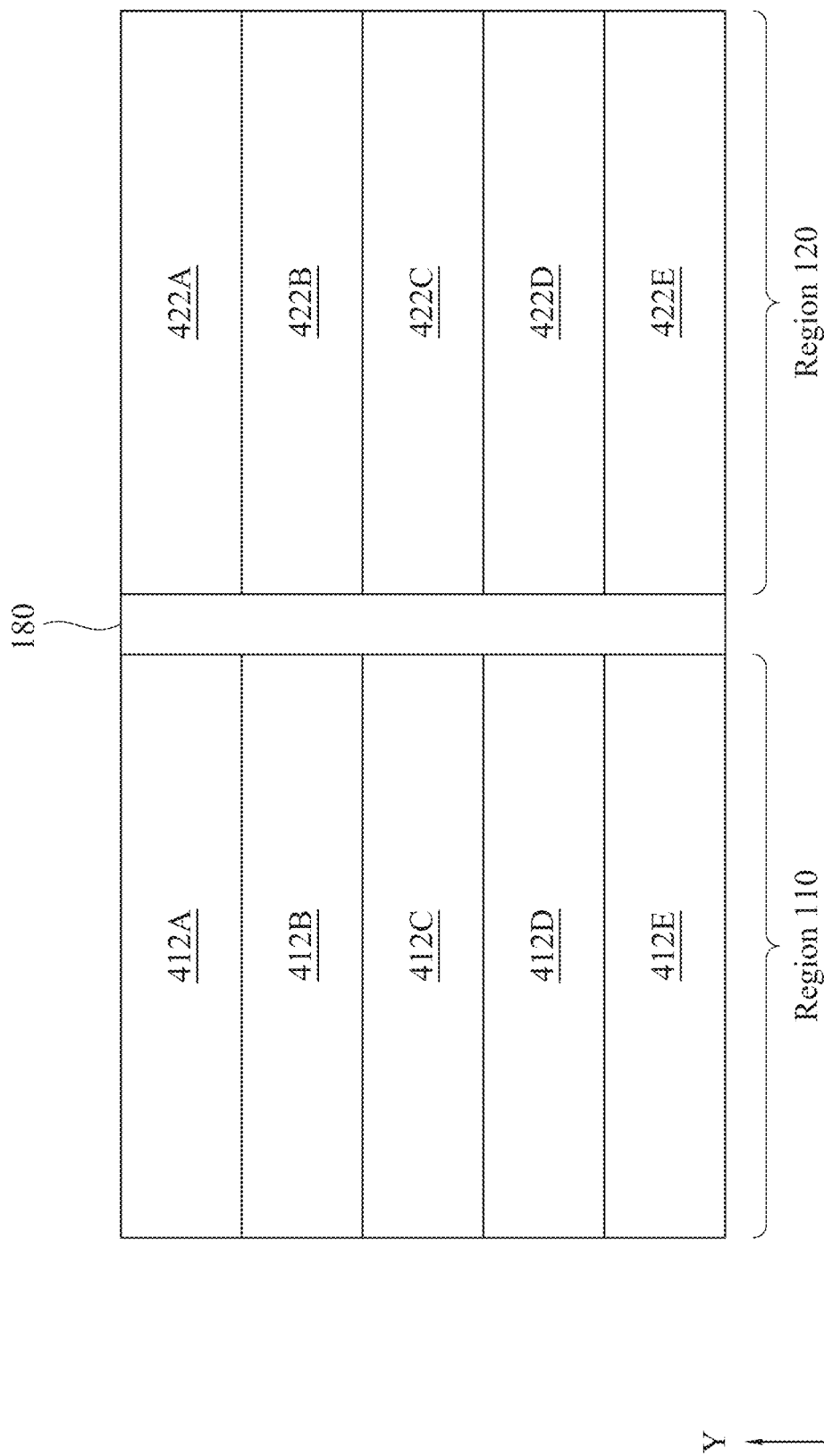
FIG. 6 is a schematic diagram of an arrangement of cell rows of FIGS. 4A-4B in a layout design of an integrated circuit, in accordance with some embodiments.

FIG. 6 is a schematic diagram of an arrangement of cell rows of FIGS. 4A-4B in a layout design of an integrated circuit, in accordance with some embodiments. In FIG. 6, the layout design includes a first group of cell rows in a region 110 and a second group of cell rows in a region 120. The region 110 includes first-type cell rows 412A, 412B, 412C, 412D, and 412E. The region 120 includes second-type cell rows 422A, 422B, 422C, 422D, and 422E. The region 110 is adjacent to the region 120 along a separation channel 180 between the region 110 and the region 120, with the separation channel 180 extending in the Y-direction. Each first-type cell row (e.g., 412A, 412B, 412C, 412D, or 412E) in the region 110 has a first row height H1. Each second-type cell row (e.g., 422A, 422B, 422C, 422D, or 422E) has a second row height H2. The first row height H1 is equal to the second row height H2. In some embodiments, the first contacted poly pitch in each of the first-type cell rows in the region 110 differs from the second contacted poly pitch in each of the second-type cell rows in the region 120. In some embodiments, each of the first-type cell rows 412A-412E is identical to the first-type cell row 412 in FIG. 4A, and each of the second-type cell rows 422A-422E is identical to the second-type cell row 422 in FIG. 4B. In some embodiments, at least one active zone in each of the first-type cell rows in the region 110 has a first predetermined number of conductive strips different from a second predetermined number of conductive strips in a corresponding active zone in the second-type cell rows in the region 120. Examples of the conductive strips include fin structures, nanosheets, and nanowires.

In the layout design of the integrated circuits in FIGS. 1A-1B and FIG. 6, two types of cell rows (e.g., the first-type cell rows in the region 110 and the second-type cell rows in the region 120) are available for positioning predesigned cells into the layout of an integrated circuit. In some embodiments, a target circuit designed with two types of cell rows may have better speed and power optimization than the same target circuit designed with only one kind of cell row. In one specific example as shown in FIGS. 1A-1B, the first row height H1 of the first-type cell row 112 is smaller than the second row height H2 of the second-type cell row 122, and in some embodiments, the first predetermined number of conductive strips in each active zone in the first-type cell row 112 is smaller than the second predetermined number of conductive strips in a corresponding active zone in the second-type cell row 122. In the specific example as described, a cell with certain design functions that is positioned in one of the first-type cell rows in the region 110 will have less power consumption and smaller cell area than an equivalent cell with same design functions that is positioned in one of the second-type cell rows in the region 120. On the other hand, a cell with certain design functions that is positioned into one of the first-type cell rows in the region 110 will have slower speed than an equivalent cell with same design functions that is positioned into one of the second-type cell rows in the region 120. Therefore, a layout designer has the option to position a cell in a second-type cell row to optimize for the speed or to position a cell in a first-type cell row to optimize for the power consumption and the cell area.

Figure 7A:
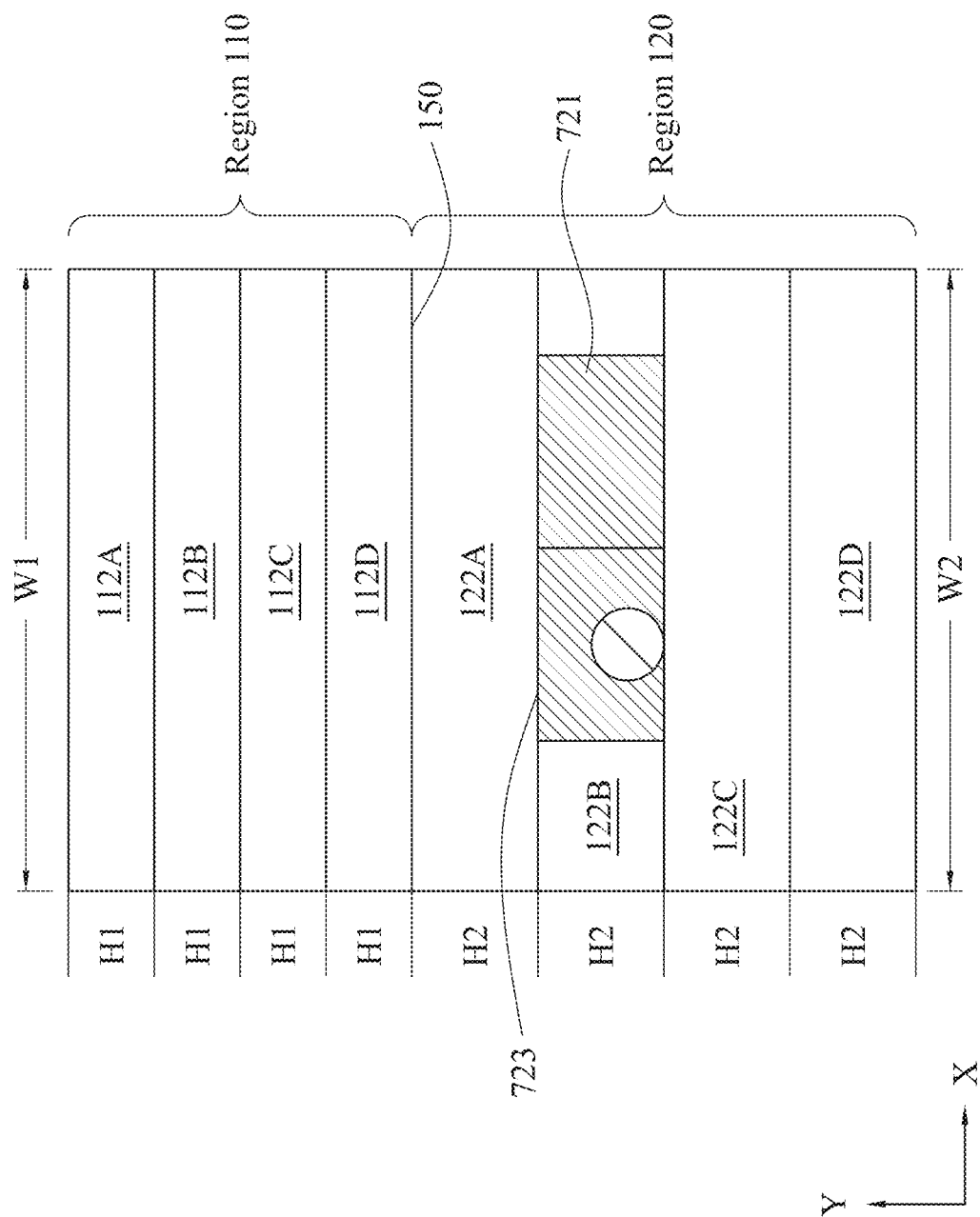
FIGS. 7A-7B and FIGS. 8A-8B are schematic diagrams of examples of mitigating design rule violations, in accordance with some embodiments.
Figure 7B:
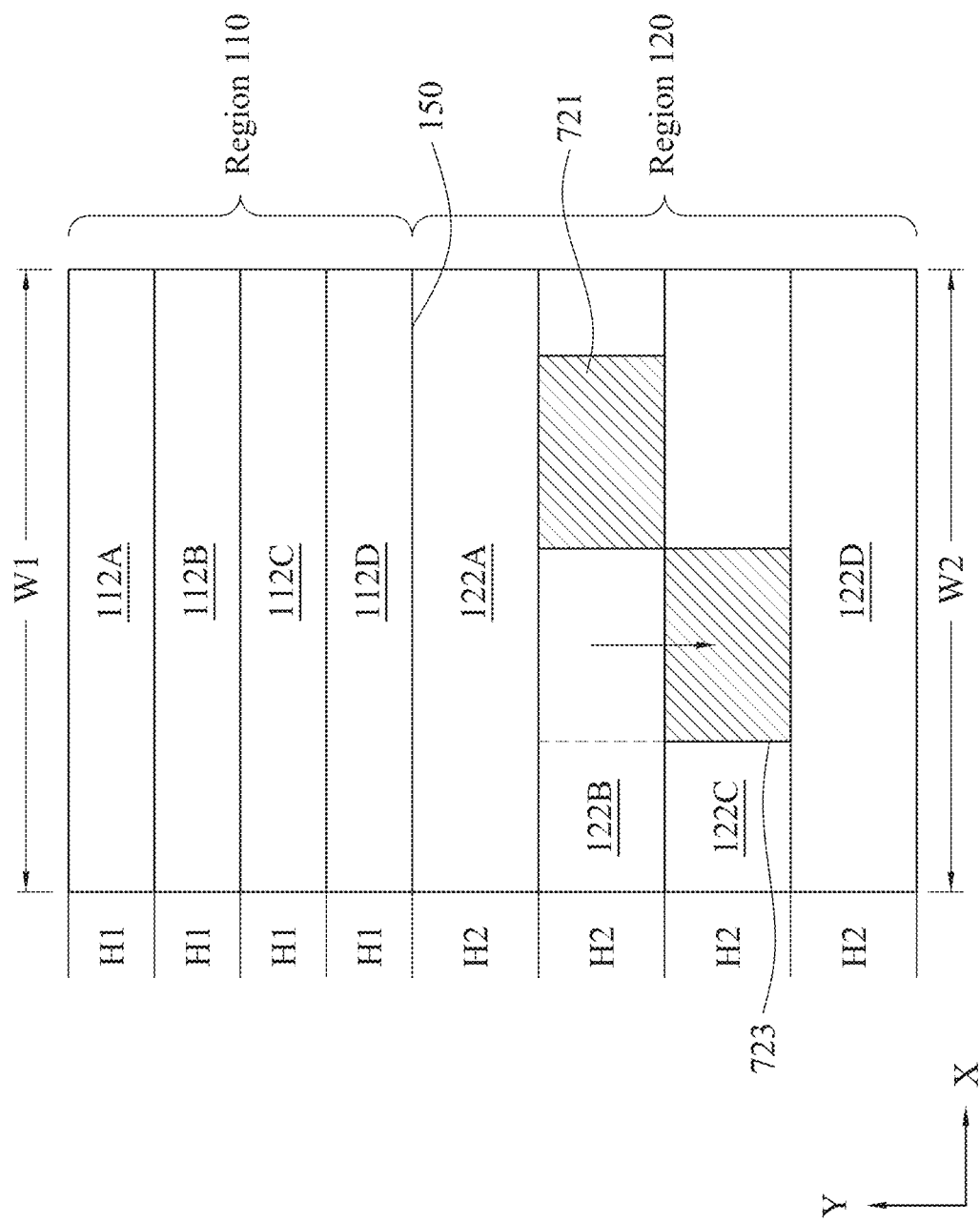
Figure 8A:
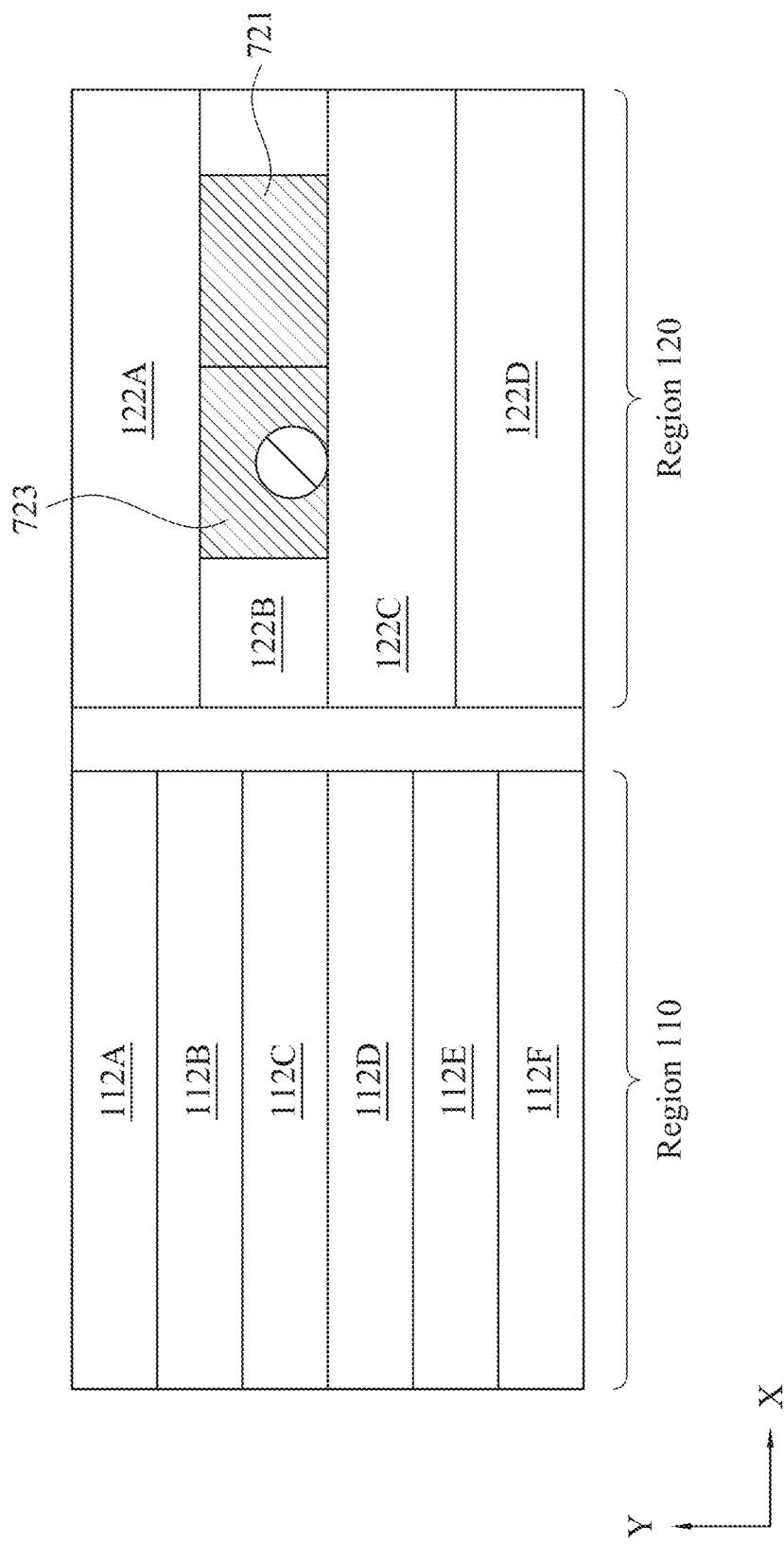
Figure 8B:
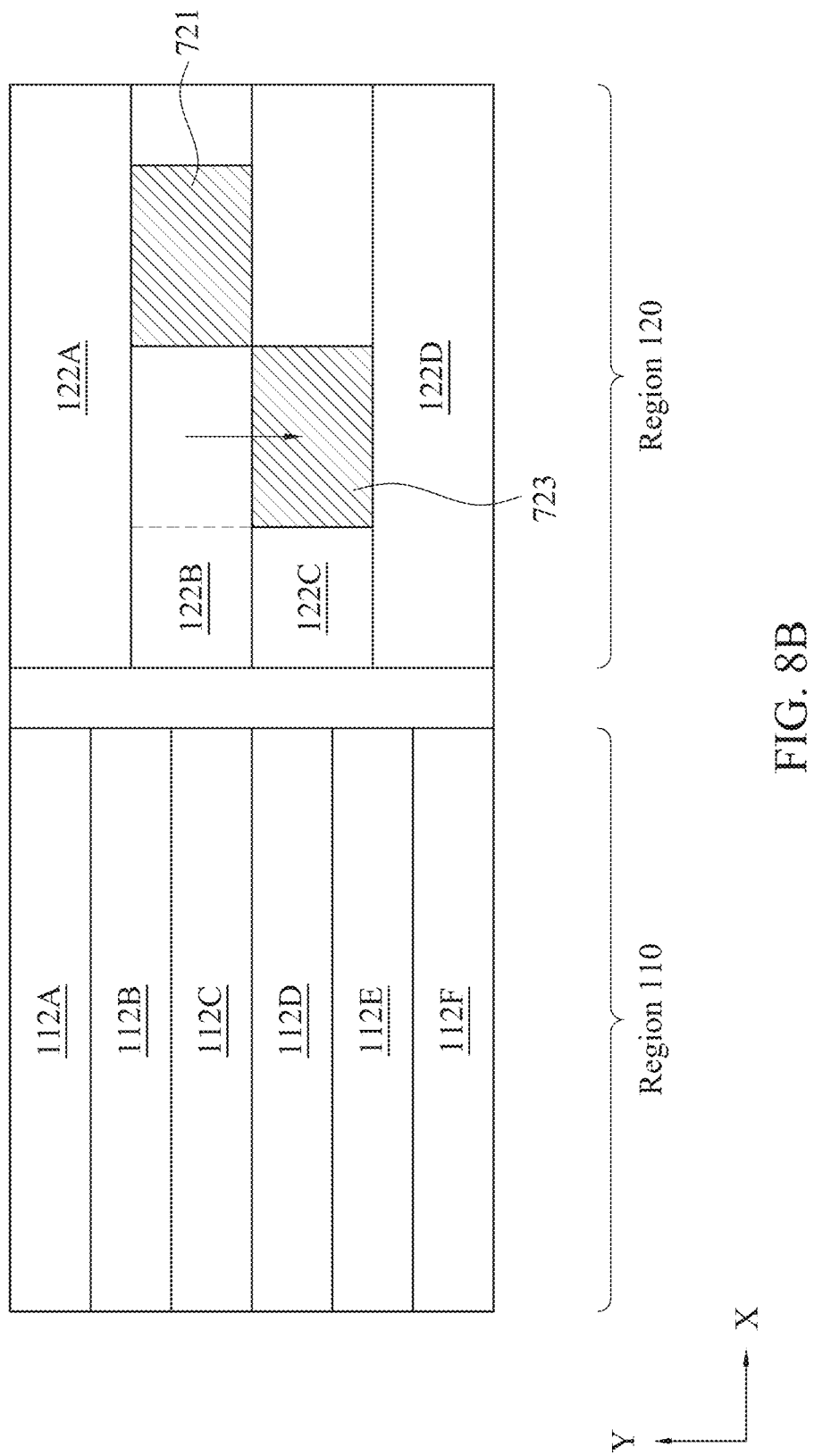

Additionally, in some embodiments, when multiple first-type cell rows are grouped together in the region 110 and multiple second-type cell rows are grouped together in the region 120, the layout designs of the integrated circuits as shown in FIGS. 1A-1B and FIG. 6 also provide cell relocating and rerouting options to mitigate certain design rule violations. FIGS. 7A-7B and FIGS. 8A-8B are schematic diagrams of examples of mitigating design rule violations, in accordance with some embodiments. In FIG. 7A and FIG. 8A, predesigned cells 721 and 723 are placed next to each other in the second-type cell row 122B, and design rule violations are detected for the predesigned cell 723 (as indicated by the slash marked circle). For some layout designs of integrated circuits, as shown in FIG. 7B and FIG. 8B, the design rule violations are mitigated by moving the predesigned cell 723 from the second-type cell row 122B to a neighboring second-type cell row in the region 120 and by rerouting conductive connections between the predesigned cell 723 and the predesigned cell 721. Because the region 120 includes multiple second-type cell rows grouped together, it is possible to move the predesigned cell 723 into a second-type cell row that is an immediate neighbor (e.g., the second-type cell row 122C) of the second-type cell row 122B. In terms of reducing the length increase of the conductive connections associated with the rerouting, moving the predesigned cell 723 into an immediate neighbor (e.g., the second-type cell row 122C) has better performance than moving the predesigned cell 723 into other second-type cell rows as in some alterative implementations. As an example of the alterative implementations, when a second-type cell row does not have an immediate neighbor of the same type (such as in implantations where each second-type cell row is immediately neighbored by two first-type cell rows), the length increase of the conductive connections associated with the rerouting will also include the additional length increase due to the conductive connections across the first-type cell row from one second-type cell row (e.g., where the predesigned cell 721 is located) to another second-type cell row (e.g., where the predesigned cell 723 is located).

While there are two types of cell rows are available for positioning predesigned cells into a layout design in FIGS. 1A-1B and FIG. 6, in other embodiments, three types of cell rows are available for positioning predesigned cells into a layout design of integrated circuits. In some embodiments, greater than three types of cell rows are used.

Figure 9A:
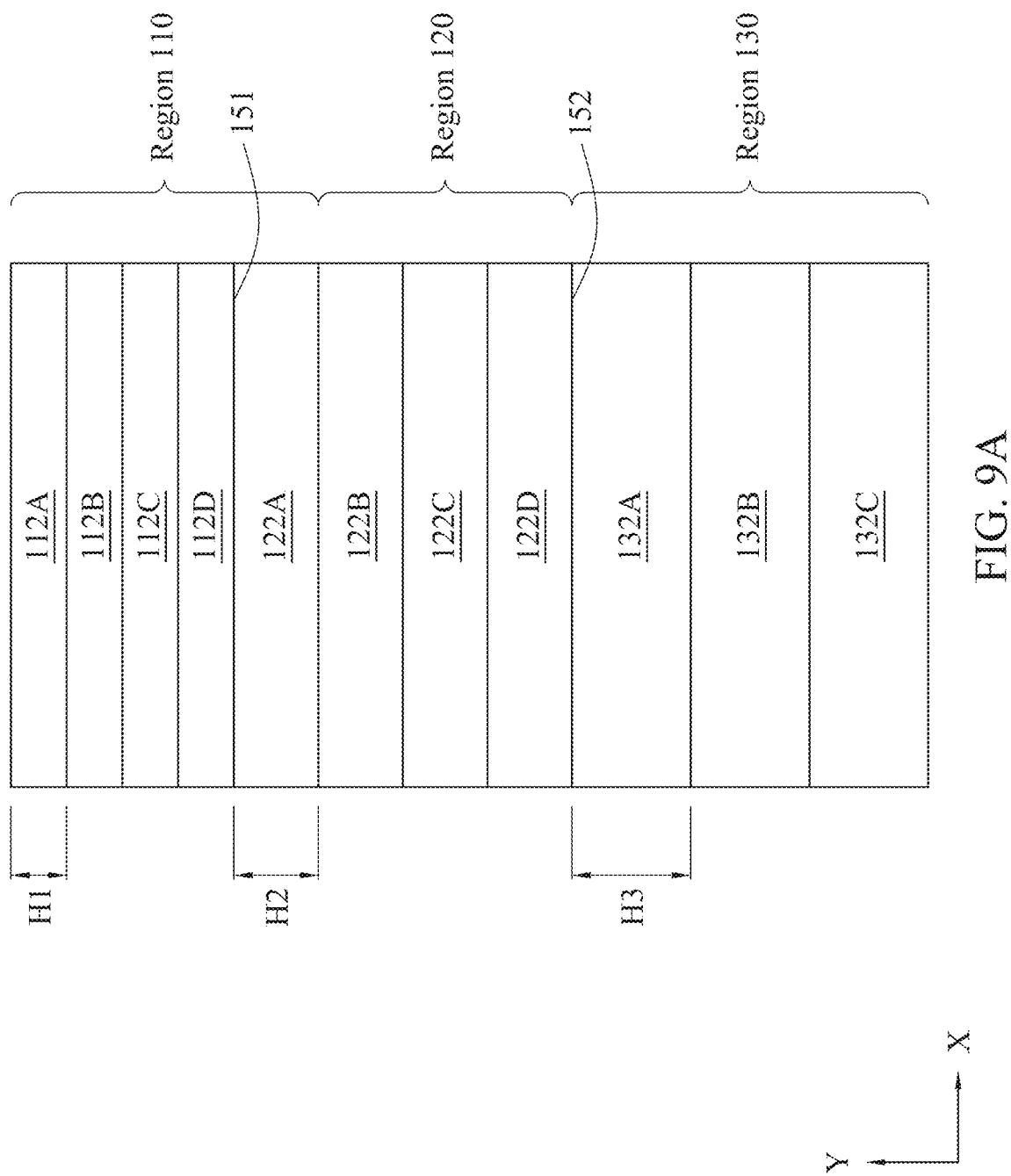
FIGS. 9A-9B are schematic diagrams of three types of cell rows arranged in a layout design, in accordance with some embodiments.
Figure 9B:
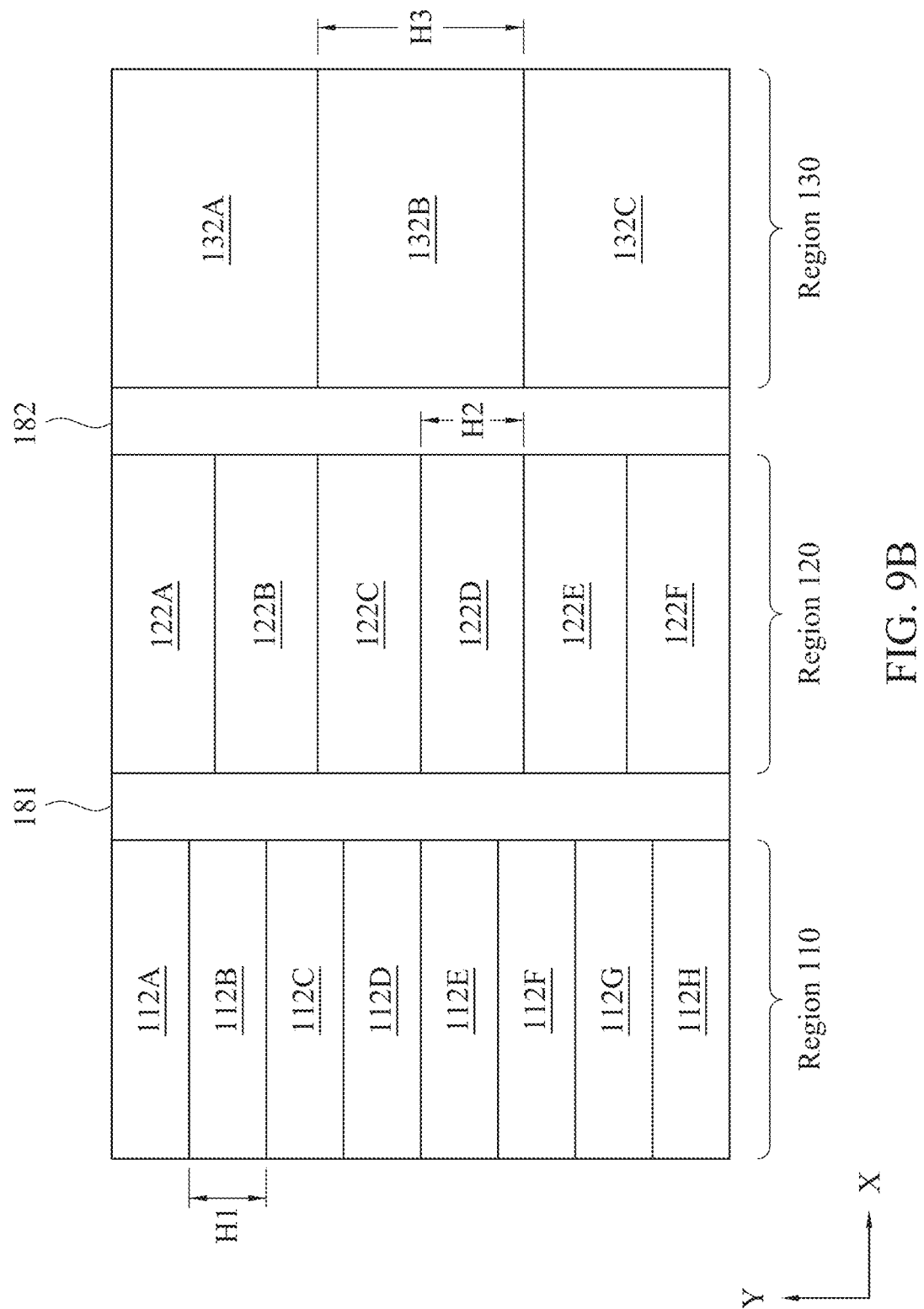

FIGS. 9A-9B are schematic diagrams of three types of cell rows arranged in a layout design, in accordance with some embodiments. In FIGS. 9A-9B, the layout design includes a first group of cell rows in a region 110, a second group of cell rows in a region 120, and a third group of cell rows in a region 130. The region 110 is adjacent to the region 120 at a first side of the region 120, and the region 130 is adjacent to the region 120 at a second side of the region 120. Here, the first side and the second side are at opposite ends of the region 120. Each first-type cell row in the region 110 has a row height H1 measured along the Y-direction, each second-type cell row in the region 120 has a row height H2 measured along the Y-direction, and each third-type cell row in the region 130 has a row height H3 extending in the Y-direction. In FIGS. 9A-9B, the row height H1, the row height H2, and the row height H3 are all different from each other.

In FIG. 9A, the region 110 includes first-type cell rows 112A-112D, the region 120 includes second-type cell rows 122A-122D, and the region 130 includes second-type cell rows 132A-132C. The region 110 is adjacent to the region 120 along a first boundary 151 extending in the X-direction, and the region 130 is adjacent to the region 120 along a second boundary 152 extending in the X-direction.

In FIG. 9B, the region 110 includes first-type cell rows 112A-112H, the region 120 includes second-type cell rows 122A-122F, and the region 130 includes second-type cell rows 132A-132C. The region 110 is adjacent to the region 120 along a first separation channel 181 between the region 110 and the region 120, and the region 130 is adjacent to the region 120 along a second separation channel 182 between the region 130 and the region 120. Each of the first separation channel 181 and the second separation channel 182 extends in the Y-direction.

In some embodiments in FIGS. 9A-9B, the three different row heights (e.g., the row height H1, the row height H2, and the row height H3) are related to three different types of active zones each corresponding to one of the three different types of cell rows. In some embodiments, each first-type cell row in the region 110 has at least one first-type active zone that is formed with a first predetermined number of conductive strips, each second-type cell row in the region 120 has at least one second-type active zone that is formed with a second predetermined number of conductive strips, and each third-type cell row in the region 130 has at least one third-type active zone that is formed with a third predetermined number of conductive strips. In some embodiments, the first predetermined number, the second predetermined number, the third predetermined number are all different from each other. Examples of the conductive strips include fin structures, nanosheets, and nanowires.

In some embodiments in FIG. 9B, a first group of gate strips in each first-type cell row in the region 110 is formed with a first contacted poly pitch CPP1, a second group of gate strips in each second-type cell row in the region 120 is formed with a second contacted poly pitch CPP2, and a third group of gate strips in each third-type cell row in the region 130 is formed with a third contacted poly pitch CPP3. In some embodiments, the first contacted poly pitch CPP1 in the region 110, the second contacted poly pitch CPP2 in the region 120, and the third contacted poly pitch CPP3 in the region 130 are all different from each other. In some embodiments, the second contacted poly pitch CPP2 in the region 120 is different from either the first contacted poly pitch CPP1 in the region 110 or the third contacted poly pitch CPP3 in the region 130.

For the layout designs of the integrated circuits in FIGS. 1A-1B and FIG. 6, two types of cell rows are available for positioning predesigned cells into integrated circuits: one type of cell rows for positioning predesigned cells that are optimized for speed, and one type of cell rows for positioning predesigned cells that are optimized for power consumption and cell areas. When there are three types of cell rows available (such as in the layout designs in FIGS. 9A-9B) for positioning predesigned cells into an integrated circuit, three types of predesigned cells are correspondingly positioned into three types of cell rows for three different types of optimization purposes. For example, a first type of predesigned cells with shortest cell heights and smallest poly pitch are used for optimizing the power consumption, a second type of predesigned cells with tallest cell heights and largest poly pitch are used for optimizing the speed, and a third type of predesigned cells with medium cell heights and medium poly pitch are used for optimizing a balance between the speed and the power consumption. Similarly, when there are more than three types of cell rows are available for positioning predesigned cells into an integrated circuit, more than three types of predesigned cells are correspondingly positioned into more than three types of cell rows. More than three types of cell rows arranged into more than three regions are within the contemplated scope of present disclosure.

Figure 10B:
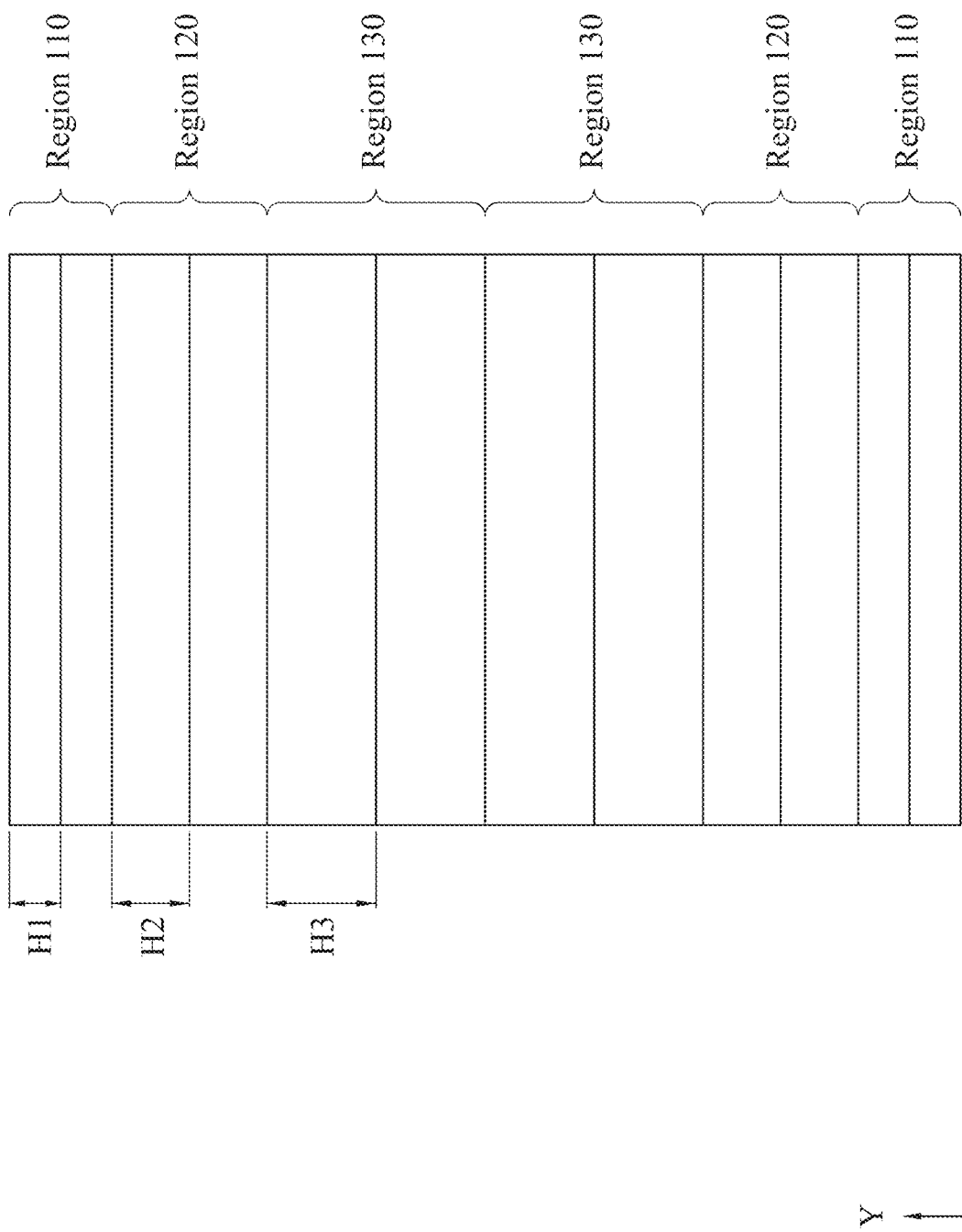
Figure 11A:
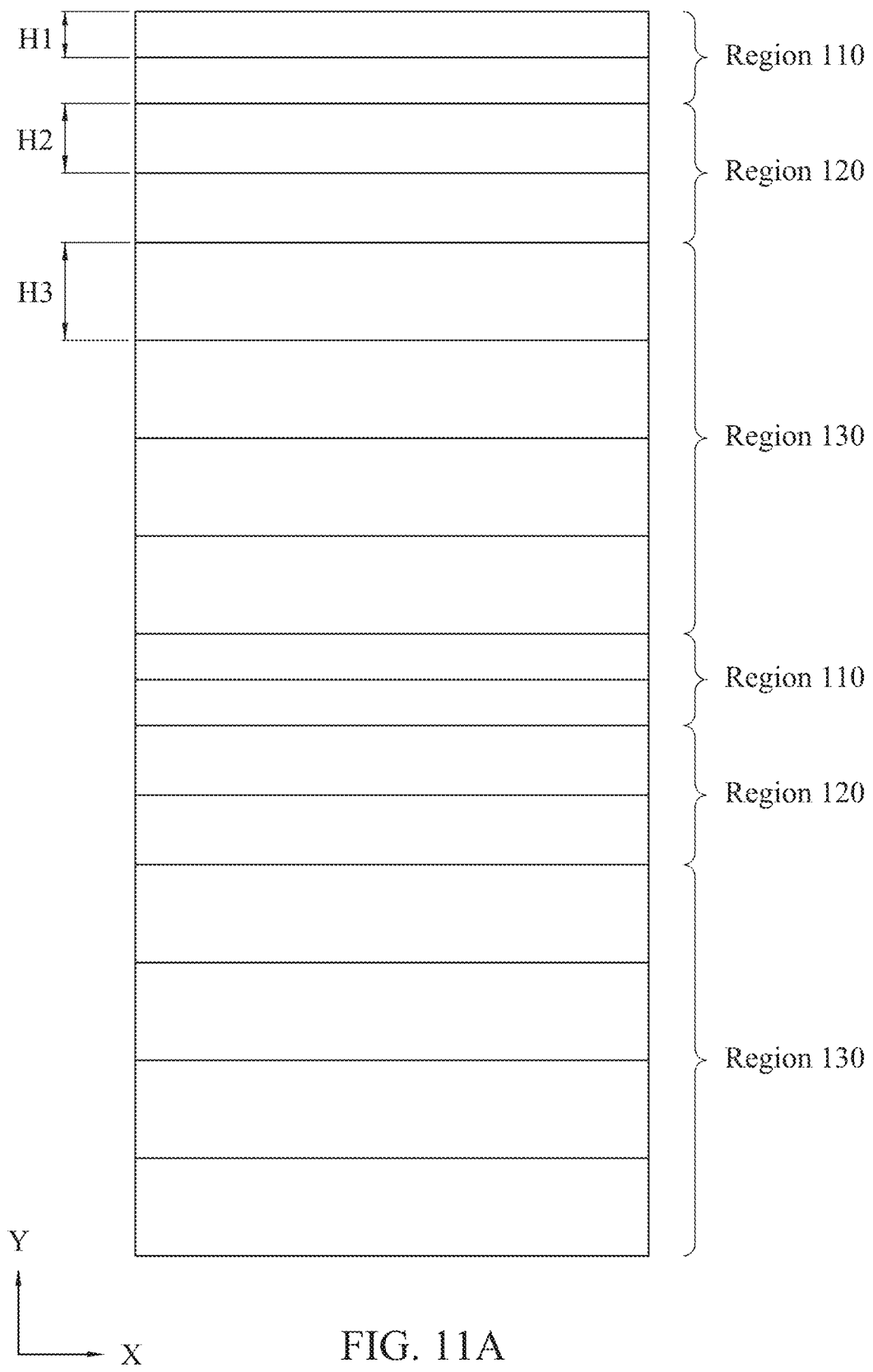
Figure 11B:
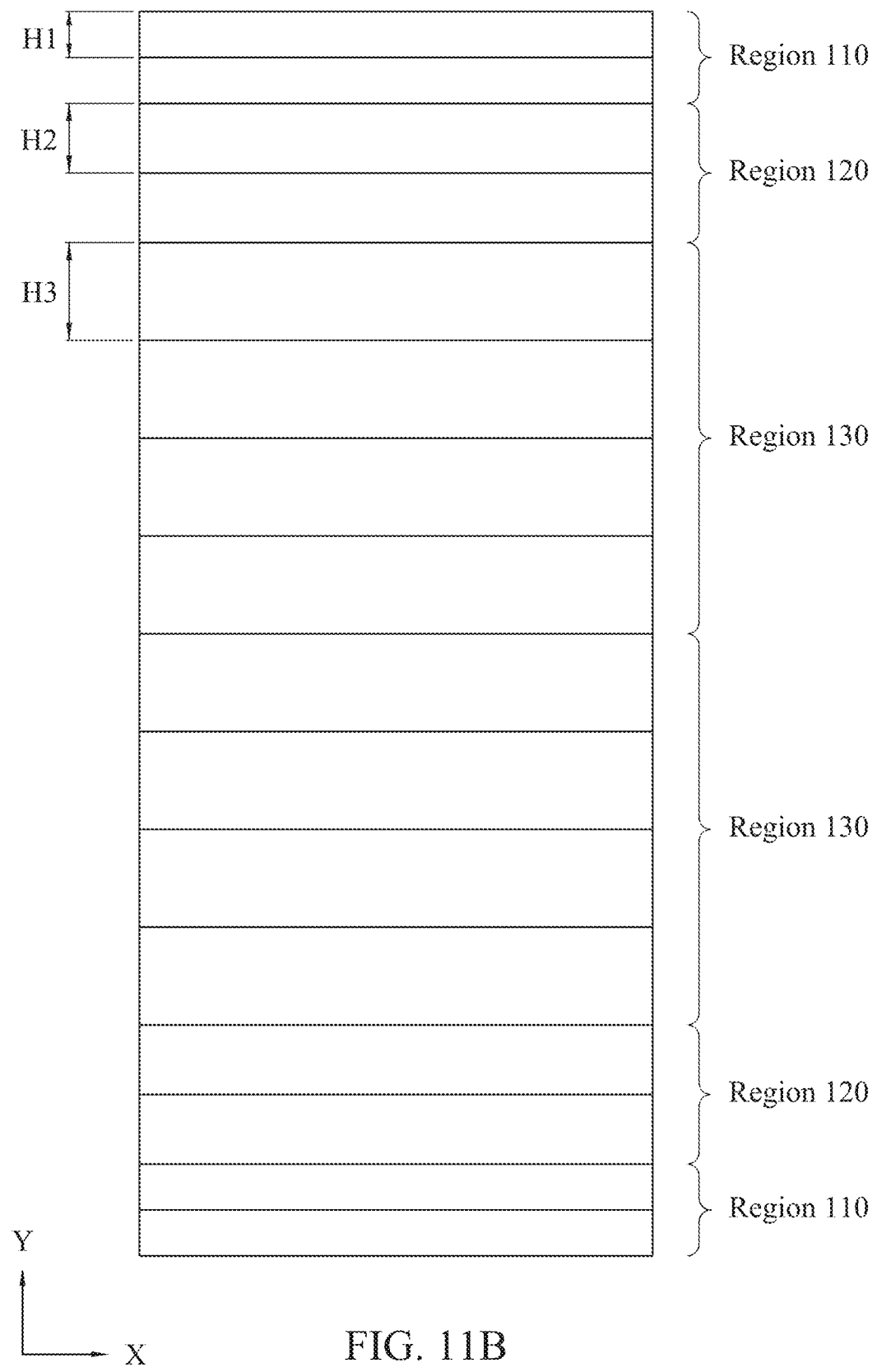

FIGS. 10A-10B, FIGS. 11A-11B, and FIGS. 12A-12B are schematic diagrams of arrangement patterns of the three regions each having at least two cell rows of a corresponding type, in accordance with some embodiments. In FIG. 10A and FIG. 11A, a sequence of regions is arranged in a forward order, vertically towards the negative Y-direction, and appears in a form of the following list: the region 110, the region 120, the region 130, the region 110, the region 120, and the region 130. In the forward order, the first three regions in the sequence (e.g., 110, 120, and 130) is arranged in an order that is identical to the order as arranged by the next three regions in the sequence (e.g., 110, 120, and 130). In FIG. 10B and FIG. 11B, a sequence of regions is arranged in a reverse order, vertically towards the negative Y-direction, and appears in a form of the following list: the region 110, the region 120, the region 130, the region 130, the region 120, and the region 110. In the reverse order, the first three regions in the sequence (e.g., 110, 120, and 130) is arranged in an order that is a reflection of the order as arranged by the next three regions in the sequence (e.g., 130, 120, and 110). In FIGS. 10A-10B and FIGS. 11A-11B, the region 110 has two first-type cell rows with the row height H1, the region 120 has two second-type cell rows with the row height H2, and the region 130 has two third-type cell rows with the row height H3. In this embodiment, the row height H1, the row height H2, and the row height H3 are different from each other. The arrangement patterns of the three distinct regions in FIGS. 10A-10B, FIGS. 11A-11B, and FIGS. 12A-12B are provided as examples, and other arrangement patterns of more than three distinct regions are within the contemplated scope of the present disclosure.

Figure 12A:
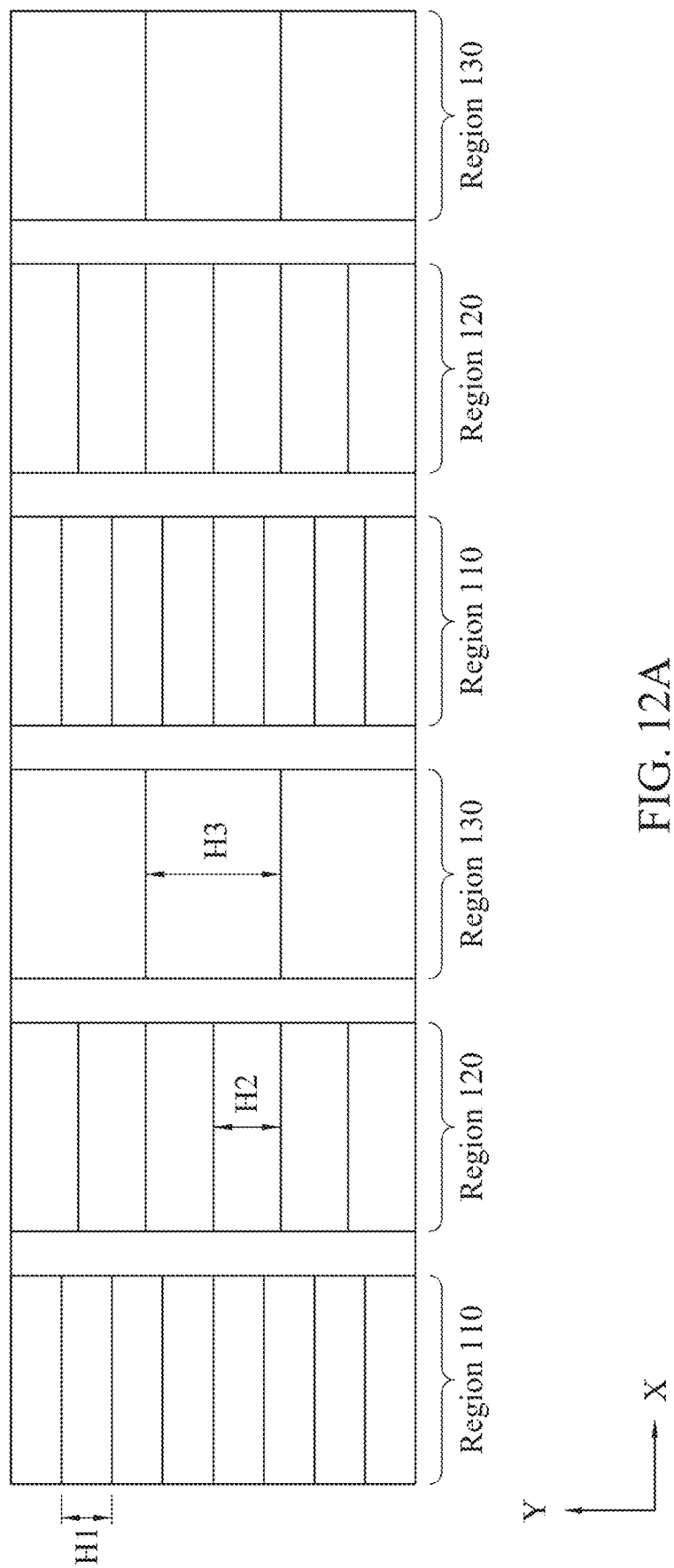
FIGS. 12A-12B are schematic diagrams of horizontal arrangements of three types of regions, in accordance with some embodiments.
Figure 12B:
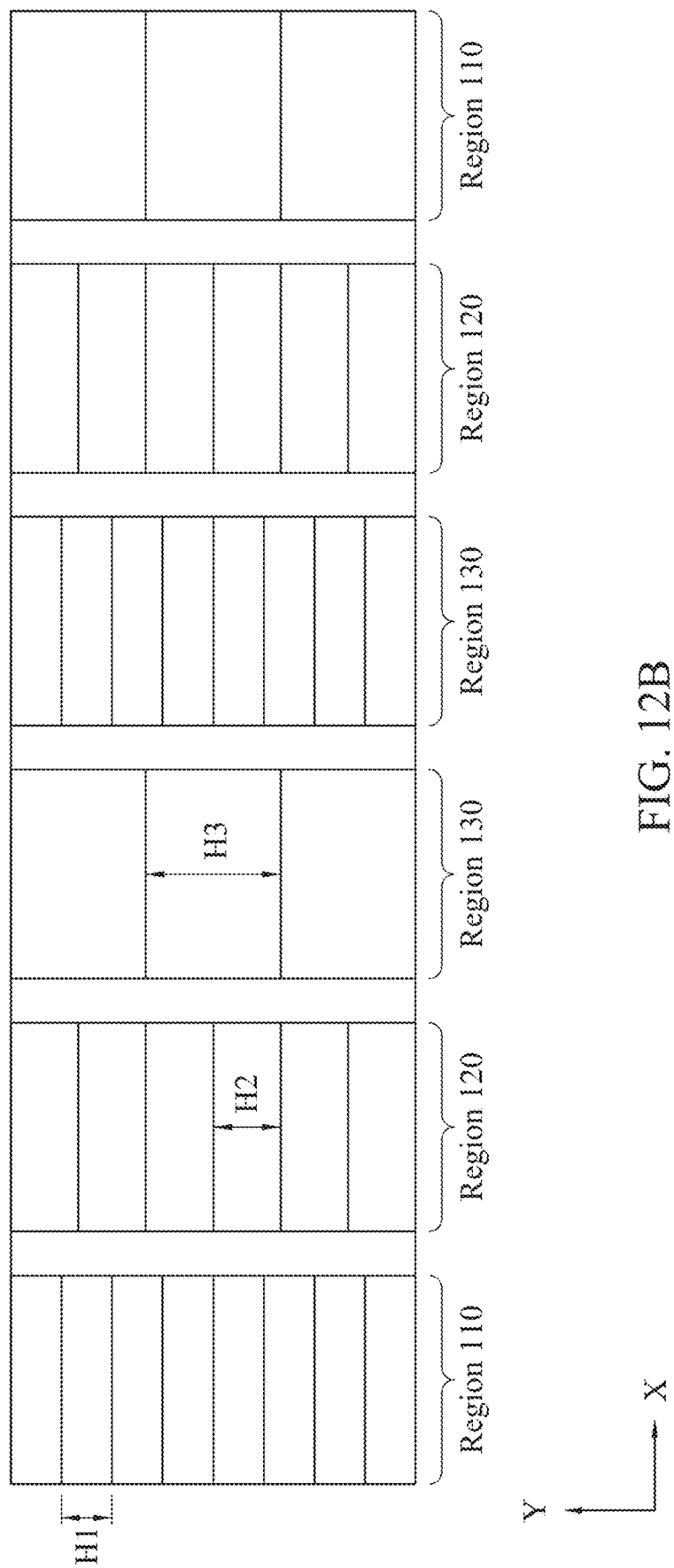

In FIG. 12A, a sequence of regions is arranged in a forward order, horizontally towards the positive X-direction, and appears in a form of the following list: the region 110, the region 120, the region 130, the region 110, the region 120, and the region 130. In FIG. 12B, a sequence of regions is arranged in a reverse order, horizontally towards the positive X-direction, and appears in a form of the following list: the region 110, the region 120, the region 130, the region 130, the region 120, and the region 110. In FIGS. 12A-12B, the region 110 has nine first-type cell rows with the row height H1, the region 120 has six second-type cell rows with the row height H2, and the region 130 has three third-type cell rows with the row height H3. In FIGS. 12A-12B, the row height H1, the row height H2, and the row height H3 are different from each other.

Figure 13A:
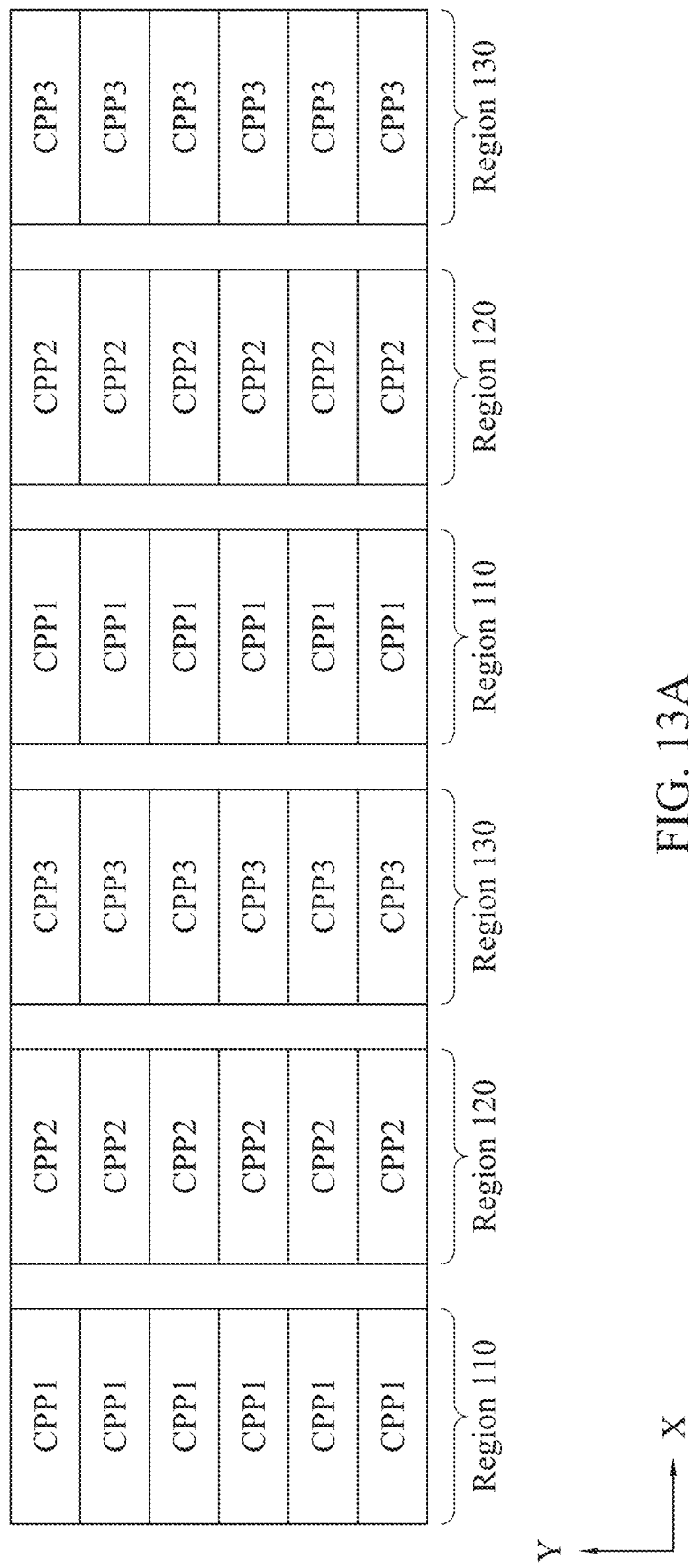
FIGS. 13A-13B are schematic diagrams of horizontal arrangements of three types of regions having cell rows of same row height, in accordance with some embodiments.
Figure 13B:
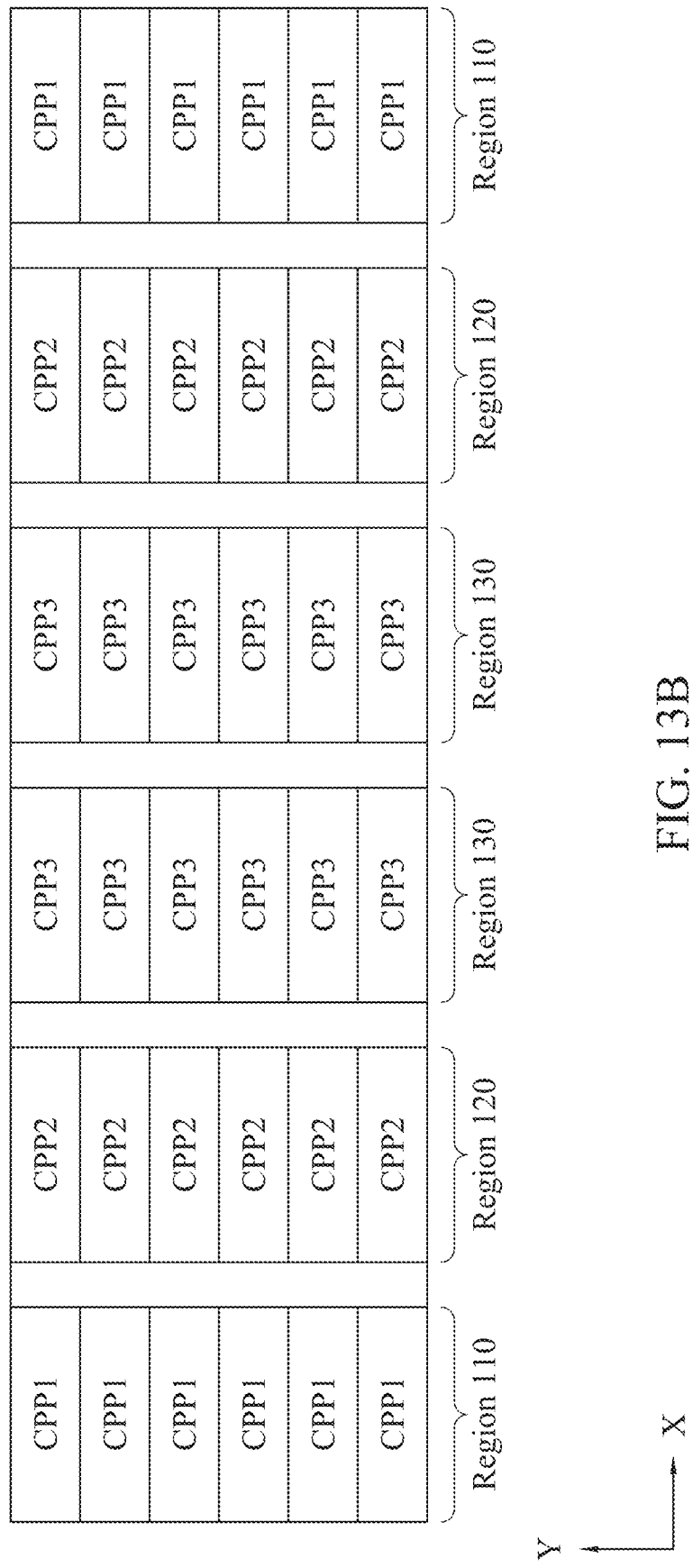

FIGS. 13A-13B are schematic diagrams of arrangement patterns of the three regions each having cell rows of a corresponding type with the same row height, in accordance with some embodiments. Unlike the embodiments in FIGS. 10A-10B, FIGS. 11A-11B, and FIGS. 12A-12B (in which the row height H1 of the first-type cell rows, the row height H2 of the second-type cell rows, and the row height H3 of the third-type cell rows are all different), in the embodiments of FIGS. 13A-13B, the row height of the first-type cell rows, the row height of the second-type cell rows, and the row height of the third-type cell rows are all the same. In FIGS. 13A-13B, each of the six first-type cell rows in the region 110 has a first contacted poly pitch CPP1, each of the six second-type cell rows in the region 120 has a second contacted poly pitch CPP2, and each of the six third-type cell rows in the region 130 has a third contacted poly pitch CPP3. In FIGS. 13A-13B, the first contacted poly pitch CPP1, the second contacted poly pitch CPP2, and the third contacted poly pitch CPP3 are all different from each other. An example of the cells in the first-type cell rows in the region 110 is the cell 410 in FIG. 4A, and an example of the cells in the second-type cell rows in the region 120 is the cell 420 in FIG. 4B. The contacted poly pitch CPP1 in the cell 410 of FIG. 4A is different from the contacted poly pitch CPP2 in the cell 420 of FIG. 4B. Based on the examples of the cell 410 in FIG. 4A and the cell 420 in FIG. 4B, in some embodiments, an cell in the third-type cell rows in the region 130 is similarly implemented with the third contacted poly pitch CPP3 which is different from both the contacted poly pitch CPP1 in the cell 410 and the contacted poly pitch CPP2 in the cell 420. In FIG. 13A, a sequence of regions is arranged in a forward order, horizontally towards the positive X-direction, and appears in a form of the following list: the region 110, the region 120, the region 130, the region 110, the region 120, and the region 130. In FIG. 13B, a sequence of regions is arranged in a reverse order, horizontally towards the positive X-direction, and appears in a form of the following list: the region 110, the region 120, the region 130, the region 130, the region 120, and the region 110.

Figure 14:
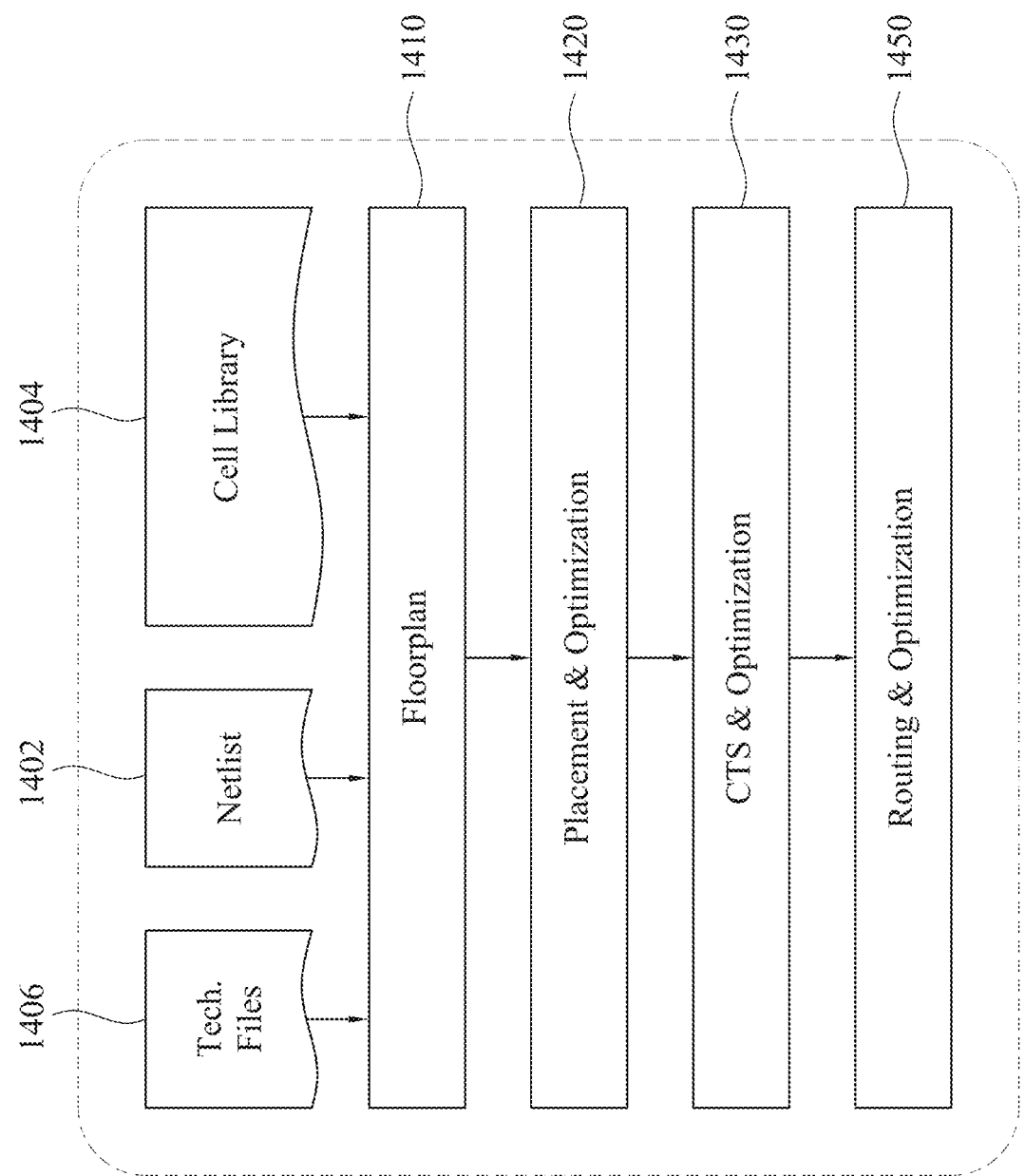
FIG. 14 is a flowchart of a process of creating a layout design of IC circuits, in accordance with some embodiments.

FIG. 14 is a flowchart of a process of creating a layout design of IC circuits, in accordance with some embodiments. In this process, a circuit design is retrieved from one or more netlist files at 1402, and the predesigned cells for the circuit design are retrieved from one or more cell library at 1404. Then, a floor plan is created at process 1410 for the circuit design, to place the predesigned cells into the layout design, according to the netlist files and the received technology files at 1406. In some embodiments, the received technology files include the information regarding various types of cell rows for accommodating the predesigned cells, such as the row heights of the various types of cell rows and/or the contacted poly pitches of the various types of cell rows. The floor plan includes specifying the positions of at least two types of regions. Each of the at least two types of regions includes multiple cell rows of a same type. In some embodiments, various types of regions are placed in the floor plan sequentially in a forward order or a reverse order. Examples of region sequences in the forward order are provided in FIG. 10A, FIG. 11A, FIG. 12A, and FIG. 13A. Examples of region sequences in the reverse order are provided in FIG. 10B, FIG. 11B, FIG. 12B, and FIG. 13B. In some embodiments, some regions are interlaced with some other regions. In some embodiments, some regions do not interlace with any other regions.

In FIG. 14, after the floor plan is created at process 1410, the predesigned cells for the circuit design are placed into the floor plan at process 1420. Various types of the predesigned cells with different cell heights and/or contacted poly pitch are selected to optimize the speed or the power consumption in some components of the circuit design. In some embodiments, various types of the predesigned cells are selected to optimize the speed, to optimize the power consumption, or to optimize the balance between the speed and the power consumption. At process 1420, the placement of the predesigned cells in the floor plan is also subjected to design rule check processes, and at least some of the predesigned cells that contribute to one or more design rule violations are identified. To mitigate the design rule violations, some of the identified predesigned cells are repositioned and moved from their initially occupied cell rows to compatible cell rows that are neighbors. A neighboring cell row is compatible with an initially occupied cell row if they are both of the same type. In some embodiments, different types of cell rows have different cell heights or the different contacted poly pitches. In some embodiments, different types of cell rows have both the different cell heights and the different contacted poly pitches. In FIG. 14, after the predesigned cells are placed into the floor plan at process 1420, at the next process 1430, clock tree synthesis is performed to minimize skew and insertion delay, and at process 1450, routing process is performed to allocate routing resources for connections and tracks assignment for individual nets. In some embodiments, the cell placement at process 1420, the clock tree synthesis at process 1430, and routing process 1450 are repeated for several iterations before the layout design of IC circuits reaches one or more design goals.

Figure 15:
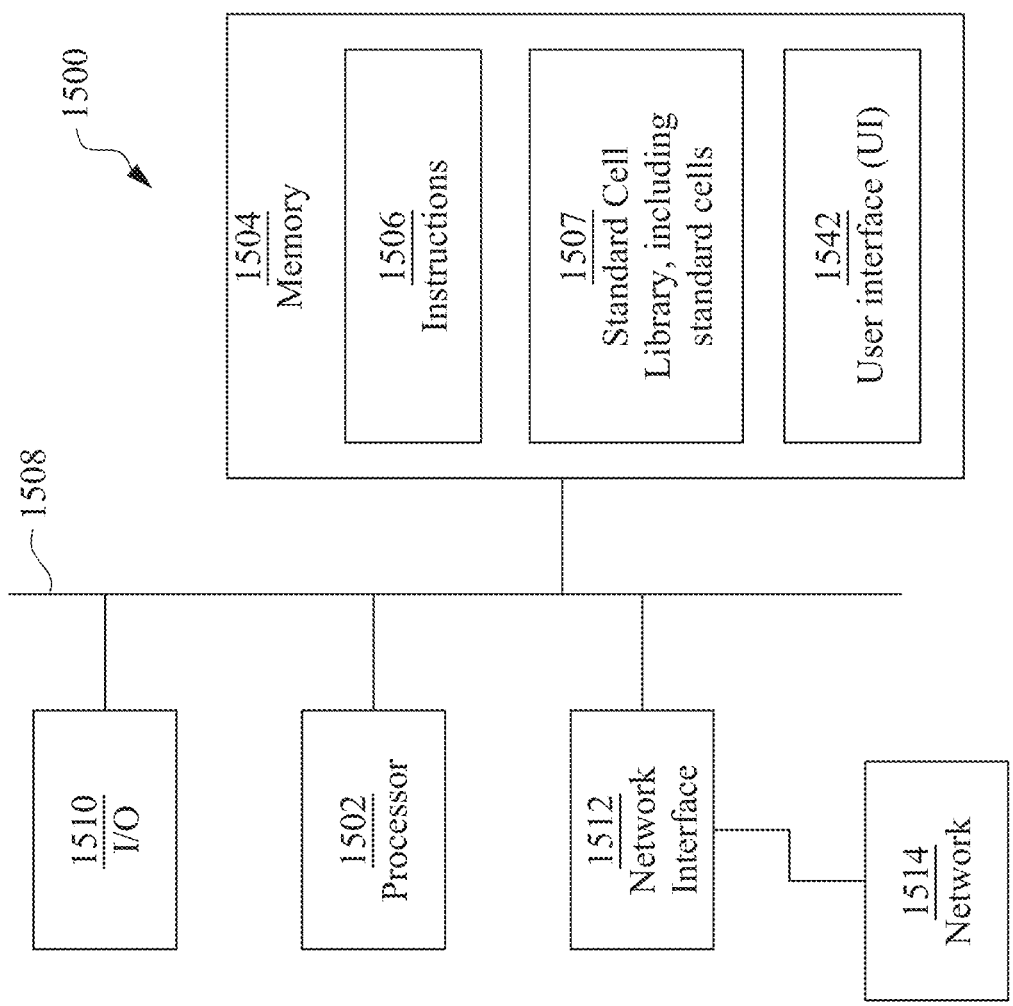
FIG. 15 is a block diagram of an electronic design automation (EDA) system in accordance with some embodiments.

FIG. 15 is a block diagram of an electronic design automation (EDA) system 1500 in accordance with some embodiments.

In some embodiments, EDA system 1500 includes an APR system. Methods described herein of designing layout diagrams represent wire routing arrangements, in accordance with one or more embodiments, are implementable, for example, using EDA system 1500, in accordance with some embodiments.

In some embodiments, EDA system 1500 is a general purpose computing device including a hardware processor 1502 and a non-transitory, computer-readable storage medium 1504. Storage medium 1504, amongst other things, is encoded with, i.e., stores, computer program code 1506, i.e., a set of executable instructions. Execution of instructions 1506 by hardware processor 1502 represents (at least in part) an EDA tool which implements a portion or all of the methods described herein in accordance with one or more embodiments (hereinafter, the noted processes and/or methods).

Processor 1502 is electrically coupled to computer-readable storage medium 1504 via a bus 1508. Processor 1502 is also electrically coupled to an I/O interface 1510 by bus 1508. A network interface 1512 is also electrically connected to processor 1502 via bus 1508. Network interface 1512 is connected to a network 1514, so that processor 1502 and computer-readable storage medium 1504 are capable of connecting to external elements via network 1514. Processor 1502 is configured to execute computer program code 1506 encoded in computer-readable storage medium 1504 in order to cause system 1500 to be usable for performing a portion or all of the noted processes and/or methods. In one or more embodiments, processor 1502 is a central processing unit (CPU), a multi-processor, a distributed processing system, an application specific integrated circuit (ASIC), and/or a suitable processing unit.

In one or more embodiments, computer-readable storage medium 1504 is an electronic, magnetic, optical, electromagnetic, infrared, and/or a semiconductor system (or apparatus or device). For example, computer-readable storage medium 1504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1504 includes a compact disk-read only memory (CD-ROM), a compact disk-read/write (CD-R/W), and/or a digital video disc (DVD).

In one or more embodiments, storage medium 1504 stores computer program code 1506 configured to cause system 1500 (where such execution represents (at least in part) the EDA tool) to be usable for performing a portion or all of the noted processes and/or methods. In one or more embodiments, storage medium 1504 also stores information which facilitates performing a portion or all of the noted processes and/or methods. In one or more embodiments, storage medium 1504 stores library 1507 of standard cells including such standard cells as disclosed herein.

EDA system 1500 includes I/O interface 1510. I/O interface 1510 is coupled to external circuitry. In one or more embodiments, I/O interface 1510 includes a keyboard, keypad, mouse, trackball, trackpad, touchscreen, and/or cursor direction keys for communicating information and commands to processor 1502.

EDA system 1500 also includes network interface 1512 coupled to processor 1502. Network interface 1512 allows system 1500 to communicate with network 1514, to which one or more other computer systems are connected. Network interface 1512 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1500.

System 1500 is configured to receive information through I/O interface 1510. The information received through I/O interface 1510 includes one or more of instructions, data, design rules, libraries of standard cells, and/or other parameters for processing by processor 1502. The information is transferred to processor 1502 via bus 1508. EDA system 1500 is configured to receive information related to a UI through I/O interface 1510. The information is stored in computer-readable medium 1504 as user interface (UI) 1542.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1500. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 16:
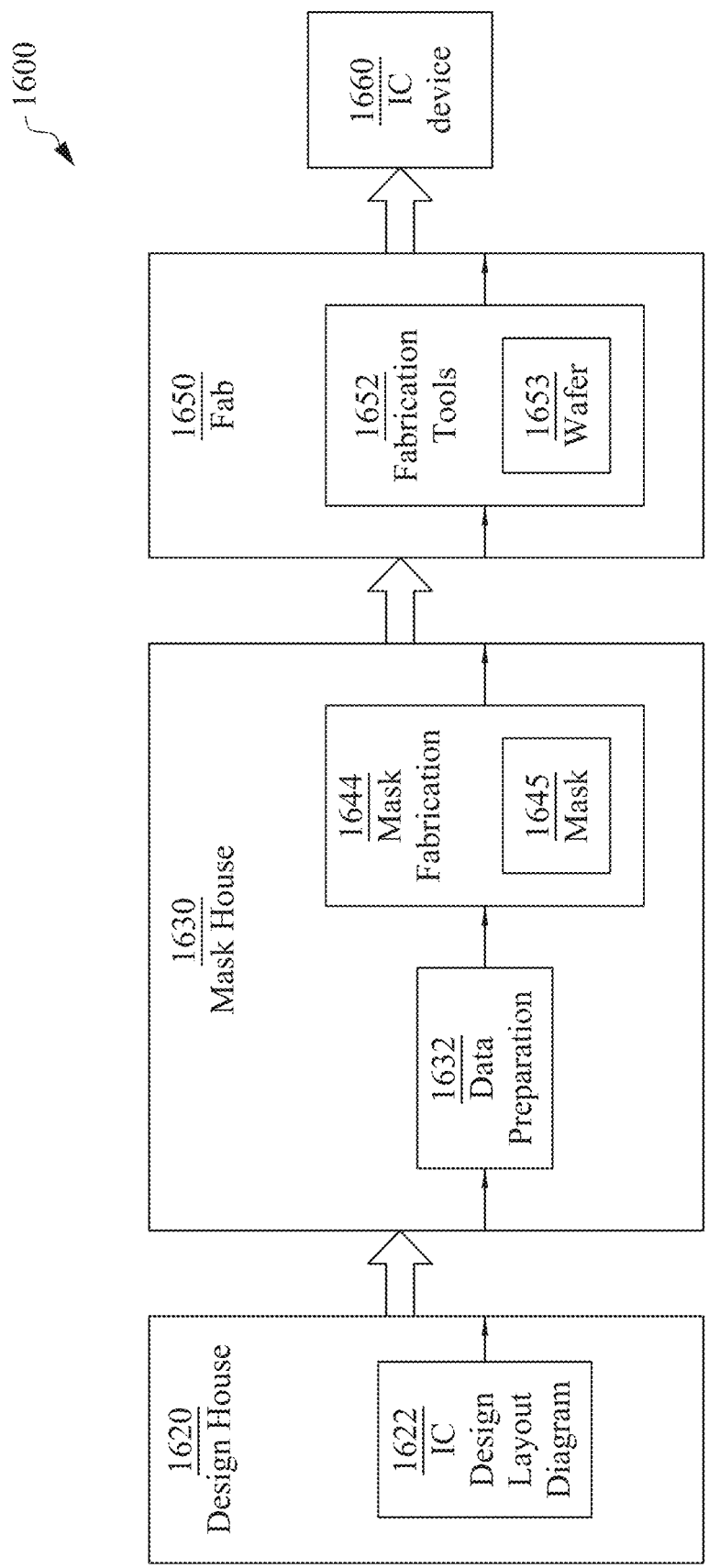
FIG. 16 is a block diagram of an integrated circuit (IC) manufacturing system, and an IC manufacturing flow associated therewith, in accordance with some embodiments.

FIG. 16 is a block diagram of an integrated circuit (IC) manufacturing system 1600, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1600.

In FIG. 16, IC manufacturing system 1600 includes entities, such as a design house 1620, a mask house 1630, and an IC manufacturer/fabricator ("fab") 1650, that interact with one another in the design, development, and manufacturing cycles and/or services related to manufacturing an IC device 1660. The entities in system 1600 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1620, mask house 1630, and IC fab 1650 is owned by a single larger company. In some embodiments, two or more of design house 1620, mask house 1630, and IC fab 1650 coexist in a common facility and use common resources.

Design house (or design team) 1620 generates an IC design layout diagram 1622. IC design layout diagram 1622 includes various geometrical patterns designed for an IC device 1660. The geometrical patterns correspond to patterns of metal, oxide, or semiconductor layers that make up the various components of IC device 1660 to be fabricated. The various layers combine to form various IC features. For example, a portion of IC design layout diagram 1622 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1620 implements a proper design procedure to form IC design layout diagram 1622. The design procedure includes one or more of logic design, physical design or place and route. IC design layout diagram 1622 is presented in one or more data files having information of the geometrical patterns. For example, IC design layout diagram 1622 can be expressed in a GDSII file format or DFII file format.

Mask house 1630 includes data preparation 1632 and mask fabrication 1644. Mask house 1630 uses IC design layout diagram 1622 to manufacture one or more masks 1645 to be used for fabricating the various layers of IC device 1660 according to IC design layout diagram 1622. Mask house 1630 performs mask data preparation 1632, where IC design layout diagram 1622 is translated into a representative data file ("RDF"). Mask data preparation 1632 provides the RDF to mask fabrication 1644. Mask fabrication 1644 includes a mask writer. A mask writer converts the RDF to an image on a substrate, such as a mask (reticle) 1645 or a semiconductor wafer 1653. The design layout diagram 1622 is manipulated by mask data preparation 1632 to comply with particular characteristics of the mask writer and/or requirements of IC fab 1650. In FIG. 16, mask data preparation 1632 and mask fabrication 1644 are illustrated as separate elements. In some embodiments, mask data preparation 1632 and mask fabrication 1644 can be collectively referred to as mask data preparation.

In some embodiments, mask data preparation 1632 includes optical proximity correction (OPC) which uses lithography enhancement techniques to compensate for image errors, such as those that can arise from diffraction, interference, other process effects and the like. OPC adjusts IC design layout diagram 1622. In some embodiments, mask data preparation 1632 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1632 includes a mask rule checker (MRC) that checks the IC design layout diagram 1622 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1622 to compensate for limitations during mask fabrication 1644, which may undo part of the modifications performed by OPC in order to meet mask creation rules.

In some embodiments, mask data preparation 1632 includes lithography process checking (LPC) that simulates processing that will be implemented by IC fab 1650 to fabricate IC device 1660. LPC simulates this processing based on IC design layout diagram 1622 to create a simulated manufactured device, such as IC device 1660. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1622.

It should be understood that the above description of mask data preparation 1632 has been simplified for the purposes of clarity. In some embodiments, data preparation 1632 includes additional features such as a logic operation (LOP) to modify the IC design layout diagram 1622 according to manufacturing rules. Additionally, the processes applied to IC design layout diagram 1622 during data preparation 1632 may be executed in a variety of different orders.

After mask data preparation 1632 and during mask fabrication 1644, a mask 1645 or a group of masks 1645 are fabricated based on the modified IC design layout diagram 1622. In some embodiments, mask fabrication 1644 includes performing one or more lithographic exposures based on IC design layout diagram 1622. In some embodiments, an electron-beam (e-beam) or a mechanism of multiple e-beams is used to form a pattern on a mask (photomask or reticle) 1645 based on the modified IC design layout diagram 1622. Mask 1645 can be formed in various technologies. In some embodiments, mask 1645 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1645 includes a transparent substrate (e.g., fused quartz) and an opaque material (e.g., chromium) coated in the opaque regions of the binary mask. In another example, mask 1645 is formed using a phase shift technology. In a phase shift mask (PSM) version of mask 1645, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1644 is used in a variety of processes. For example, such a mask(s) is used in an ion implantation process to form various doped regions in semiconductor wafer 1653, in an etching process to form various etching regions in semiconductor wafer 1653, and/or in other suitable processes.

IC fab 1650 is an IC fabrication business that includes one or more manufacturing facilities for the fabrication of a variety of different IC products. In some embodiments, IC Fab 1650 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1650 includes fabrication tools 1652 configured to execute various manufacturing operations on semiconductor wafer 1653 such that IC device 1660 is fabricated in accordance with the mask(s), e.g., mask 1645. In various embodiments, fabrication tools 1652 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1650 uses mask(s) 1645 fabricated by mask house 1630 to fabricate IC device 1660. Thus, IC fab 1650 at least indirectly uses IC design layout diagram 1622 to fabricate IC device 1660. In some embodiments, semiconductor wafer 1653 is fabricated by IC fab 1650 using mask(s) 1645 to form IC device 1660. In some embodiments, the IC fabrication includes performing one or more lithographic exposures based at least indirectly on IC design layout diagram 1622. Semiconductor wafer 1653 includes a silicon substrate or other proper substrate having material layers formed thereon. Semiconductor wafer 1653 further includes one or more of various doped regions, dielectric features, multi-level interconnects, and the like (formed at subsequent manufacturing steps).

Details regarding an integrated circuit (IC) manufacturing system (e.g., system 1600 of FIG. 16), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to a method of generating, by a processor, a layout design of an integrated circuit. The method includes forming a first region having at least two first-type cell rows extending in a first direction, where each one of the first-type cell rows has a first row height measured along a second direction perpendicular to the first direction. The method includes forming a second region having at least two second-type cell rows extending in the first direction, where each one of the second-type cell rows has a second row height measured along the second direction. The first region is adjacent to the second region, and the first row height of the first-type cell rows is different from the second row height of the second-type cell rows.

Another aspect of this description relates to a computer program code stored on a non-transitory computer-readable medium for generating a layout design. The computer program code is configured to cause a system having at least one processor to execute forming a first region having at least two first-type cell rows extending in a first direction, where each one of the first-type cell rows has a first row height measured along a second direction perpendicular to the first direction. The computer program code is also configured to cause the system to execute forming a second region having at least two second-type cell rows extending in the first direction, where each one of the second-type cell rows has a second row height measured along the second direction. The computer program code is further configured to cause the system to execute forming a third region having at least two third-type cell rows extending in the first direction, where each one of the third-type cell rows has a third row height measured along the second direction. The first region is adjacent to the second region at a first side and the third region is adjacent to the second region at a second side, and the first side and the second side are at opposite ends of the second region along the first direction. The first row height, the second row height, and the third row height are all different from each other.

Still another aspect of this description relates to a method of generating, by a processor, a layout design of an integrated circuit. The method includes forming a first region having at least two first-type cell rows extending in a first direction. The method includes forming a second region having at least two second-type cell rows extending in the first direction, where the first region is adjacent to the second region along a first separation channel extending in a second direction that is perpendicular to the first direction. The method includes forming a first group of gate strips having a first contacted poly pitch in each one of the first-type cell rows. The method includes forming a second group of gate strips having a second contacted poly pitch in each one of the second-type cell rows, where the first contacted poly pitch is different from the second contacted poly pitch.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of generating, by a processor, a layout design of an integrated circuit, the method comprising:
   forming a first region having at least two first-type cell rows extending in a first direction, wherein each one of the first-type cell rows has a first row height measured along a second direction perpendicular to the first direction;
   forming a second region having at least two second-type cell rows extending in the first direction, wherein each one of the second-type cell rows has a second row height measured along the second direction; and
   wherein the first region is adjacent to the second region, and the first row height of the first-type cell rows is different from the second row height of the second-type cell rows.

2. The method of claim 1, further comprising:
   forming a third region that has at least two third-type cell rows extending in the first direction, wherein each one of the third-type cell rows has a third row height measured along the second direction; and
   wherein the third region is adjacent to the second region, and the third row height is different from the first row height, the second row height, or both the first row height and the second row height.

3. The method of claim 1, wherein the first region is adjacent to the second region along a boundary extending in the first direction.

4. The method of claim 3, further comprising:
   forming a first predetermined number of conductive strips in each first-type active zone in the first-type cell rows;
   forming a second predetermined number of conductive strips in each second-type active zone in the second-type cell rows; and
   wherein the first predetermined number is different from the second predetermined number.

5. The method of claim 1, wherein the first region is adjacent to the second region along a separation channel between the first region and the second region, the separation channel extending in the second direction.

6. The method of claim 5, further comprising:
   forming a first predetermined number of conductive strips in each first-type active zone in the first-type cell rows;
   forming a second predetermined number of conductive strips in each second-type active zone in the second-type cell rows; and
   wherein the first predetermined number is different from the second predetermined number.

7. The method of claim 5, further comprising:
   forming a first group of gate strips having a first contacted poly pitch in each one of the first-type cell rows;
   forming a second group of gate strips having a second contacted poly pitch in each one of the second-type cell rows; and
   wherein the first contacted poly pitch is different from the second contacted poly pitch.

8. The method of claim 7, further comprising:
   forming a first predetermined number of conductive strips in each first-type active zone in the first-type cell rows;
   forming a second predetermined number of conductive strips in each second-type active zone in the second-type cell rows; and
   wherein the first predetermined number is different from the second predetermined number.

9. A computer program code stored on a non-transitory computer-readable medium for generating a layout design, the computer program code is configured to cause a system having at least one processor to execute:
   forming a first region having at least two first-type cell rows extending in a first direction, wherein each one of the first-type cell rows has a first row height measured along a second direction perpendicular to the first direction;
   forming a second region having at least two second-type cell rows extending in the first direction, wherein each one of the second-type cell rows has a second row height measured along the second direction;
   forming a third region having at least two third-type cell rows extending in the first direction, wherein each one of the third-type cell rows has a third row height measured along the second direction; and
   wherein the first region is adjacent to the second region at a first side and the third region is adjacent to the second region at a second side, wherein the first side and the second side are at opposite ends of the second region; and
   wherein the first row height, the second row height, and the third row height are all different from each other.

10. The computer program code of claim 9, further configured to cause the system having the at least one processor to execute:
    forming a first predetermined number of conductive strips in each first-type active zone in the first-type cell rows;
    forming a second predetermined number of conductive strips in each second-type active zone in the second-type cell rows;
    forming a third predetermined number of conductive strips in each third-type active zone in the third-type cell rows; and wherein the first predetermined number, the second predetermined number, the third predetermined number are all different from each other.

11. The computer program code of claim 9, wherein the first region is adjacent to the second region along a first boundary extending in the first direction, and wherein the third region is adjacent to the second region along a second boundary extending in the first direction.

12. The computer program code of claim 9, wherein the first region is adjacent to the second region along a first separation channel between the first region and the second region, and wherein the third region is adjacent to the second region along a second separation channel between the third region and the second region, and wherein each of the first separation channel and the second separation channel extends in the second direction.

13. The computer program code of claim 12, further configured to cause the system having the at least one processor to execute:
    forming a first group of gate strips having a first contacted poly pitch in each one of the first-type cell rows;
    forming a second group of gate strips having a second contacted poly pitch in each one of the second-type cell rows; and
    forming a third group of gate strips having a third contacted poly pitch in each one of the third-type cell rows.

14. The computer program code of claim 13, wherein the first contacted poly pitch, the second contacted poly pitch, and the third contacted poly pitch are all different from each other.

15. The computer program code of claim 13, wherein the second contacted poly pitch is different from either the first contacted poly pitch or the third contacted poly pitch.

16. A method of generating, by a processor, a layout design of an integrated circuit, the method comprising:
    forming a first region having at least two first-type cell rows extending in a first direction;
    forming a second region having at least two second-type cell rows extending in the first direction, wherein the first region is adjacent to the second region along a first separation channel extending in a second direction that is perpendicular to the first direction;
    forming a first group of gate strips having a first contacted poly pitch in each one of the first-type cell rows; and
    forming a second group of gate strips having a second contacted poly pitch in each one of the second-type cell rows, wherein the first contacted poly pitch is different from the second contacted poly pitch.

17. The method of claim 16, wherein each one of the first-type cell rows has a first row height measured along the second direction, and each one of the second-type cell rows has a second row height measured along the second direction, and wherein the first row height is different from the second row height.

18. The method of claim 17, further comprising:
    forming a first predetermined number of conductive strips in each first-type active zone in the first-type cell rows;
    forming a second predetermined number of conductive strips in each second-type active zone in the second-type cell rows; and
    wherein the first predetermined number is different from the second predetermined number.

19. The method of claim 16, further comprising
    forming a third region having at least two third-type cell rows extending in the first direction, wherein the third region is adjacent to the second region along a second separation channel extending in the second direction; and
    forming a third group of gate strips having a third contacted poly pitch in each one of the third-type cell rows, wherein the third contacted poly pitch is different from the first contacted poly pitch, the second contacted poly pitch, or both the first contacted poly pitch and the second contacted poly pitch.

20. The method of claim 19, wherein each one of the first-type cell rows has a first row height measured along the second direction, each one of the second-type cell rows has a second row height measured along the second direction, and each one of the third-type cell rows has a third row height measured along the second direction, and wherein the first row height, the second row height, and the third row height are all different from each other.

* * * * *